US012689068B2

(12) United States Patent
Hird et al.

(10) Patent No.: US 12,689,068 B2
(45) Date of Patent: Jul. 21, 2026

(54) BATTERY MONITORING SYSTEM

(71) Applicant: Schlumberger Technology Corporation, Sugar Land, TX (US)

(72) Inventors: Jonathan Robert Hird, Cambridge (GB); Norman Ward, Gloucester (GB); Nicholas Collins, Stonehouse (GB); John Charlesworth, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 613 days.

(21) Appl. No.: 18/194,744

(22) Filed: Apr. 3, 2023

(65) Prior Publication Data

US 2024/0332642 A1 Oct. 3, 2024

(51) Int. Cl.
*H01M 10/42* (2006.01)
*H01M 10/48* (2006.01)

(52) U.S. Cl.
CPC ....... *H01M 10/425* (2013.01); *H01M 10/486* (2013.01); *H01M 2010/4271* (2013.01); *H01M 2010/4278* (2013.01)

(58) Field of Classification Search
CPC ............. H01M 10/425; H01M 10/486; H01M 2010/4271; H01M 2010/4278
See application file for complete search history.

(56) References Cited

U.S. PATENT DOCUMENTS

| 2012/0121961 A1* | 5/2012 | Hall | H01M 10/654 |
| | | | 429/163 |
| 2016/0226081 A1* | 8/2016 | Navarro | H01M 6/5038 |
| 2016/0241053 A1* | 8/2016 | Erdos | H01M 10/425 |
| 2019/0115600 A1* | 4/2019 | Navarro | H01M 6/5038 |
| 2021/0301630 A1* | 9/2021 | Krippner | E21B 33/085 |
| 2023/0087283 A1* | 3/2023 | Liu | H02J 7/80 |
| | | | 320/124 |
| 2024/0152195 A1 | 5/2024 | Hird | |

FOREIGN PATENT DOCUMENTS

| CA | 2901061 A1 * | 10/2014 | E21B 47/13 |
| EA | 032656 B1 | 6/2019 | |
| GC | 0002655 | 3/2014 | |
| GC | 0009286 | 12/2018 | |
| WO | 2006019304 A1 | 2/2006 | |
| WO | 2023069283 A1 | 4/2023 | |

* cited by examiner

*Primary Examiner* — Alexander Usyatinsky
(74) *Attorney, Agent, or Firm* — Jeffrey D. Frantz

(57) ABSTRACT

A battery comprises a housing, one or more energy cells contained within the housing, and a battery monitoring system contained within the housing. The battery monitoring system includes a health sensor configured to take health measurements corresponding to a health condition of the battery. The battery monitoring system includes an electronic module configured to communicate one or more signals corresponding to the health measurements such that the health condition may be determined.

14 Claims, 12 Drawing Sheets

650

651

652

870

| Operating battery monitoring system in a sleep state | 871 |

| Monitoring for a trigger event | 872 |

| Waking the battery monitoring system to an active state | 873 |

| Taking and communicating health measurements | 874 |

BATTERY MONITORING SYSTEM

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

Downhole drilling operations typically involve the use of drilling rigs and a variety of specialized tools, including sensors and electronic devices, for example, to collect data and control the drilling process. Batteries are often used as a source of power for these devices, but the harsh and remote environments of downhole drilling operations can cause damage to the batteries, reducing their performance and lifespan.

Monitoring the damage caused to batteries in downhole drilling operations is critical to ensure cost and time efficient operation of various drilling tools. This includes the ability to detect and diagnose battery damage, as well as predicting the remaining lifespan of the battery. This can help to avoid unexpected downtime and equipment failures, as well as reduce maintenance costs.

SUMMARY

In some embodiments, a battery includes a housing, one or more energy cells contained within the housing, and a battery monitoring system contained within the housing. The battery monitoring system includes a health sensor configured to take health measurements corresponding to health condition of the battery. The battery monitoring system includes an electronic module configured to communicate one or more signals corresponding to the health measurements such that the health condition may be determined.

In some embodiments, a method of operating a battery monitoring system includes, during downhole drilling operations, taking health measurements with a health sensor of the battery monitoring system. The health measurements correspond to a health condition of a battery operatively connected to a downhole tool. The battery monitoring system is contained within a housing of the battery secured to the downhole tool. The method further comprises recording the health measurements with an electronic module of the battery monitoring system. The method further comprises communicating the health measurements recorded by the electronic module such that a health condition of the battery can be determined.

In some embodiments, a method of operating a battery monitoring system includes, operating the battery monitoring system in a sleep state. The battery monitoring system is contained within a housing of a battery configured to connect to a downhole tool to provide electrical power to the downhole tool. The method further comprises, while in the sleep state, monitoring, with one or more sensors of the battery monitoring system, for a trigger event associated with a downhole drilling operation of the downhole tool. The method further comprises, based on detecting the trigger event, waking the battery monitoring system to an active state. The method further comprises, while in the active state, taking health measurements corresponding to a health condition of the battery, and communicating one or more signals corresponding to the health measurements such that the health condition may be determined.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a perspective view of a downhole battery, according to at least one embodiment of the present disclosure;

FIG. 2-2 is a perspective view of the downhole battery of FIG. 2-1.

FIG. 3-1 is a block diagram of a battery monitoring system, according to at least one embodiment of the present disclosure;

FIG. 3-2 is a block diagram of the battery monitoring system of FIG. 3-1;

FIG. 3-3 is a block diagram of the battery monitoring system of FIG. 3-1;

FIG. 3-4 is a block diagram of the battery monitoring system of FIG. 3-1;

FIG. 4 is an example of a drilling tool assembly, according to at least one embodiment of the present disclosure;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

This disclosure generally relates to devices, systems, and methods for measuring and logging battery diagnostics. For example, a drilling system may employ one or more drilling tools that operate, at least in part, on electrical power. A downhole battery may be included in the drilling system to power a function of one or more of the drilling tools. The downhole drilling environment may have an adverse effect on the health and/or performance of the battery. The battery may include a battery monitoring system for measuring and/or recording one or more drilling parameters associated with a health condition of the battery. For example, the battery monitoring system may include one or more sensors for measuring health measurements associated with the battery, such as temperature, vibration, shock, current, voltage etc. The battery monitoring system may take one or more health measurements during downhole drilling operations. The battery monitoring system may include an electronics module, in a non-limiting example, a datalogger for recording the health measurements to a backlog. The backlog may facilitate determining (for example, after a downhole drilling operation) whether the battery may be reused for a subsequent downhole drilling operation.

The battery monitoring system may be internal to, and integrally formed in the battery. For example, the battery may be manufactured with the battery monitoring system internal to the battery. The battery monitoring system may be electrically powered by the battery and may use a minimal amount of electricity. The battery monitoring system may operate in a low power sleep state and may wake to an active state when drilling activities are detected. In this way, a downhole tool battery as described herein may have advantages over conventional downhole batteries powering drilling tools.

Figure 1:
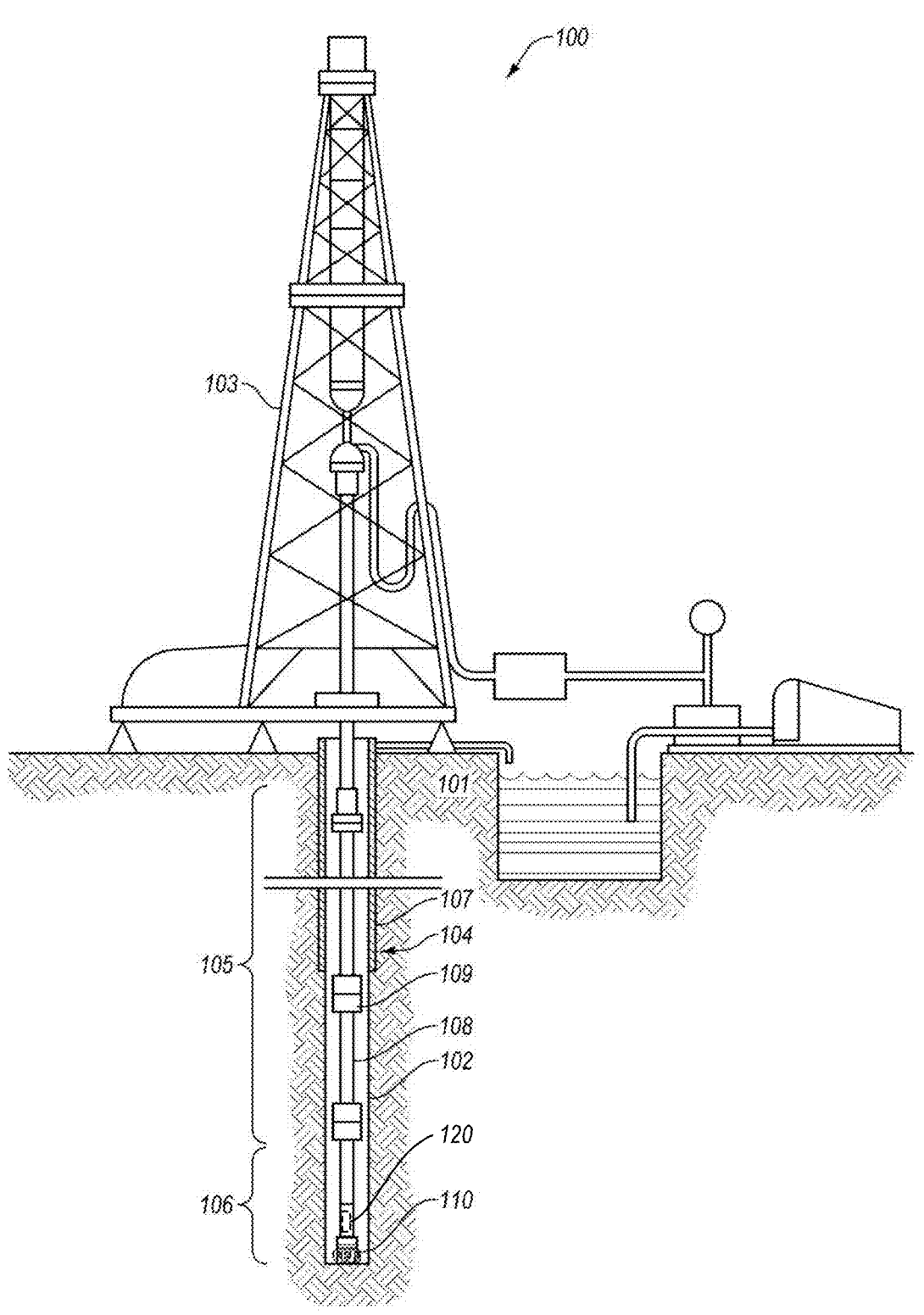
FIG. 1 is an example of a drilling system, according to at least one embodiment of the present disclosure.

FIG. 1 shows one example of a drilling system 100 for drilling an earth formation 101 to form a wellbore 102, according to at least one embodiment of the present disclosure. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore 102. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

As just mentioned, the BHA 106 and/or the drill string 105 (e.g., the drilling tool assembly 104) may include various drilling components. A function of one or more of these drilling components may operate, at least in part, on electrical power. For example, one or more of the components (e.g., a bit, reamer, stabilizer, sub, MWD tool, LWD tool, etc.) may include a sensor, a computing device, an electrical actuator, etc. To power these electronic devices, in some embodiments, the drill system 100 includes a downhole tool battery 120. For example, each drilling component may include a downhole tool battery 120 to power the on-board electronics of that component. In some embodiments, two or more drilling components may be powered by one downhole tool battery 120.

In some embodiments, the downhole tool battery 120 is connected or secured to one or more drilling components. In some embodiments, the downhole tool battery 120 is located within or inside of one or more drilling components. In some embodiments, the downhole tool battery 120 provides electrical power to a downhole electronic device while downhole drilling operations are being performed. In this way, the downhole tool battery 120 being secured to the drilling component may subject the downhole tool battery 120 to various dynamics of the downhole environment, such as high temperatures, vibrations, accelerations, impacts, etc. These dynamics may have an adverse effect on the performance, capacity, lifespan, etc. of the downhole tool battery 120. In some embodiments, the downhole tool battery 120 includes a battery monitoring system for sensing and/or detecting dynamics related to battery health, for logging and/or recording measurements related to these dynamics, and for facilitating resolving a health condition of the downhole tool battery 120.

Figures 1, 2:
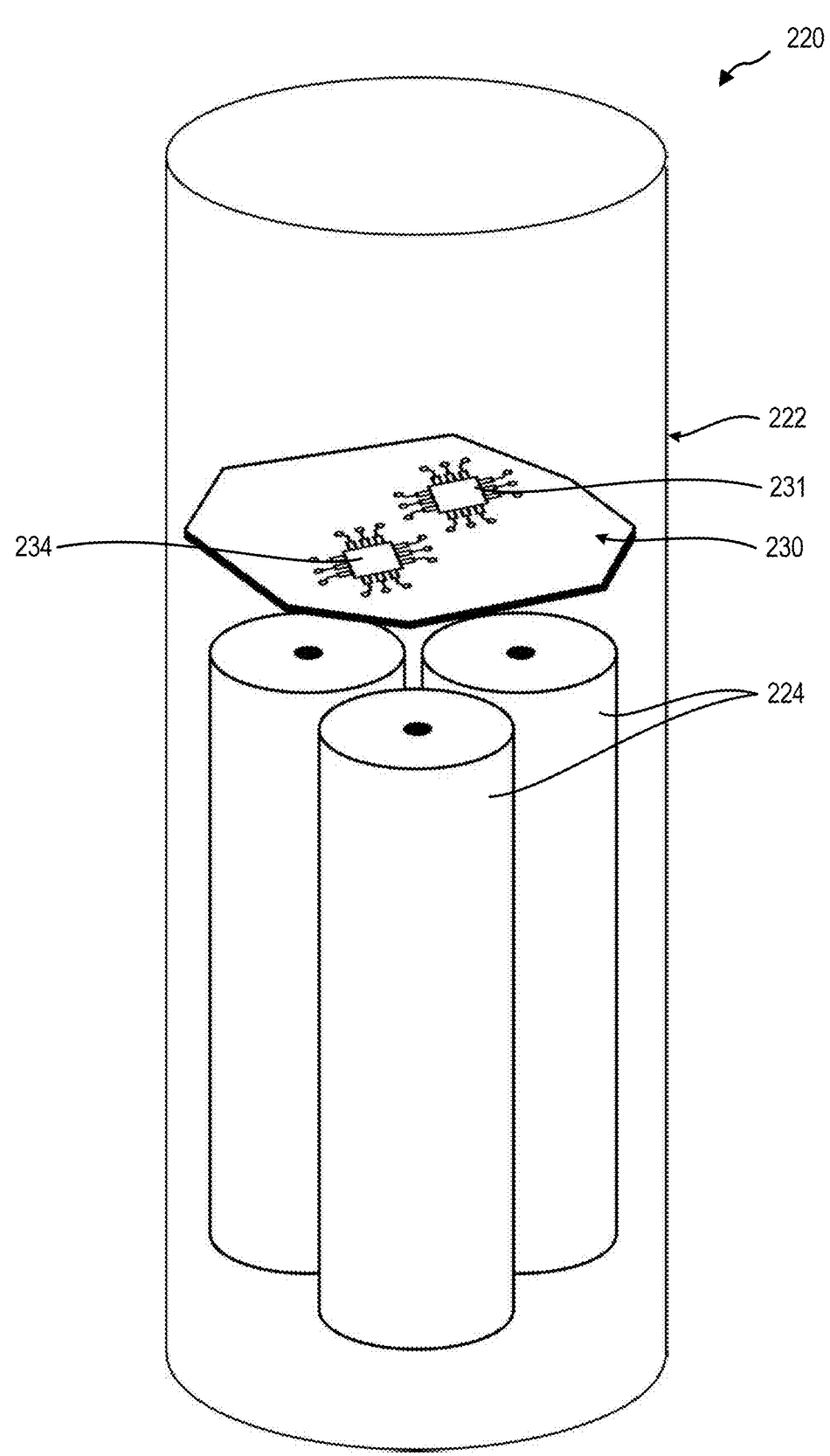
Figure 2:
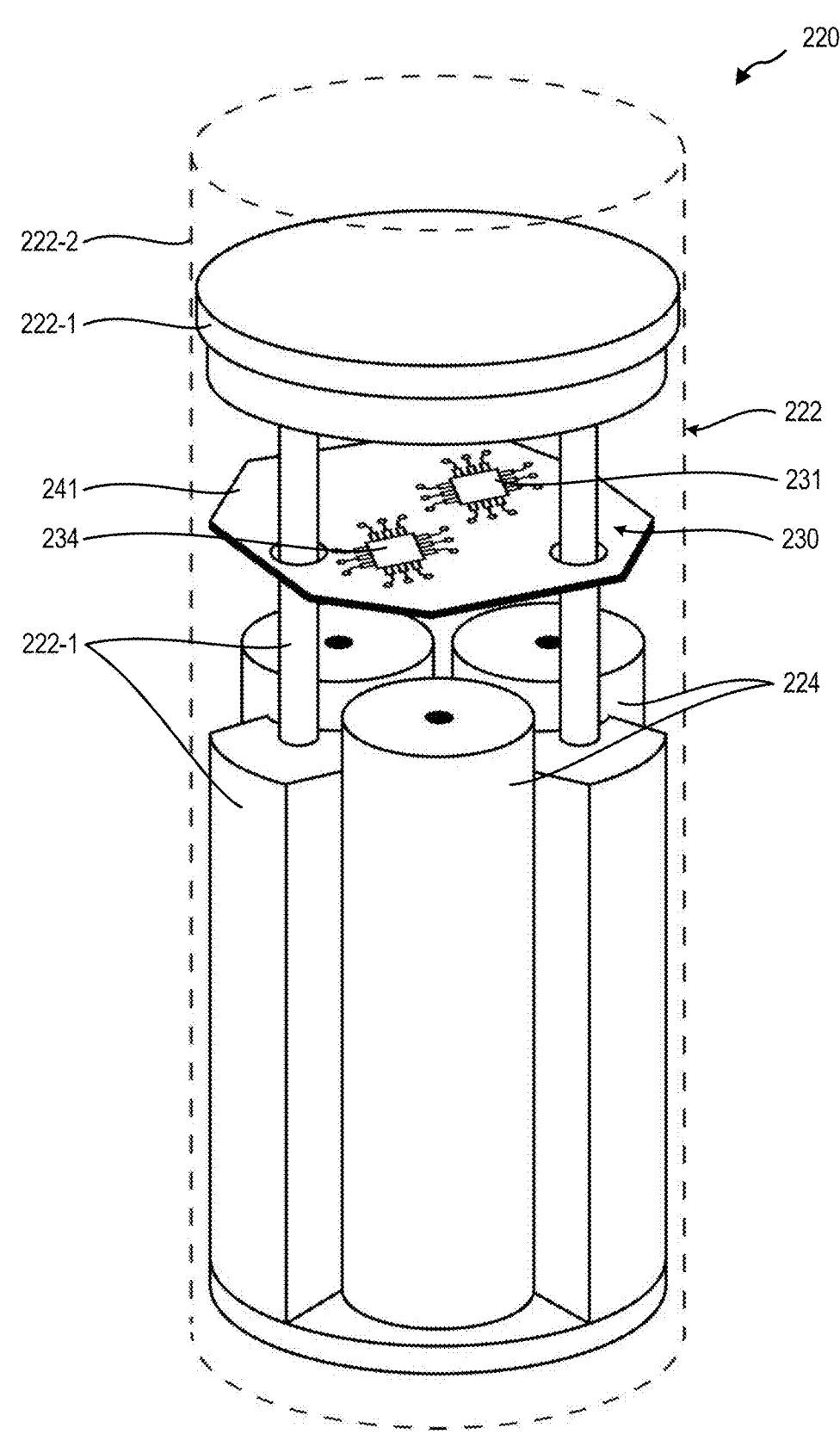

FIG. 2-1 is a perspective view of a downhole tool battery 220, according to at least one embodiment of the present disclosure. In some embodiments, the battery 220 includes one or more energy cells 224. For example, the one or more energy cells 224 may be portable voltaic cells for storing electrical energy. The energy cells 224 may be operatively coupled to one or more electronic devices of a drilling component to power the electronic devices as discussed herein. In some embodiments, the energy cells 224 are lithium thionyl chloride energy cells. The energy cells 224 may be lithium-ion, lead-acid, alkaline, nickel-metal-hydride, carbon-zinc, silver-oxide, zinc-air, or nickel-cadmium energy cells, or any other energy cell (and combinations thereof) suitable for electrically powering downhole electronic devices as described herein. The energy cells 224 may be fuel cells, such as hydrogen fuel cells. In some embodiments, the energy cells are primary, or single-use (e.g., non-rechargeable) energy cells. For example, the energy cells may be dry cell batteries. In some embodiments, the energy cells 224 are secondary, or rechargeable energy cells. In some embodiments, the energy cells 224 have a capacity of 30 Ah. The energy cells 224 may have a capacity of more or less than 30 Ah, such as 5 Ah, 10 Ah, 15 Ah, 20 Ah, 25 Ah, 30 Ah, 35 Ah, 40 Ah, 45 Ah, 50 Ah, 100 Ah, 150 Ah, 200 Ah, or any value therebetween. In this way, the battery 220 may store electrical energy in order to power one or more downhole electronic devices.

In some embodiments, the battery 220 includes a battery monitoring system ("BMS") 230. In some embodiments, the BMS 230 monitors and/or controls one or more aspects of the battery 220. For example, the BMS 230 may control an electrical energy output of the energy cells 224. In another example, the BMS 230 may measure and/or monitor one or more drilling parameters associated with the energy cells 224, such as a temperature, a shock, or a vibration experienced by the energy cells, as will be discussed herein. In this way, the BMS 230 may be electronically coupled to and/or operatively associated with the energy cells 224 for monitoring and/or controlling one or more drilling parameters of the battery 220.

In some embodiments, the BMS 230 includes an electronic module 231, in a non-limiting example a datalogger, and a health sensor 234. The health sensor 234 may include one or more sensors for sensing and/or measuring one or more drilling parameters associated with the battery 220 (e.g., during downhole drilling operations). For example, the health sensor 234 may include a temperature sensor and/or a vibrations sensor, among others. The electronic module 231 may be configured to receive the measurements from the health sensor 234. In some embodiments, the electronic module 231 communicates one or more signals corresponding to the measurements, as will be discussed herein. In some embodiments, the electronic module 231, in a non-limiting example a datalogger, records or logs the measurements. As will be discussed herein, the electronic module 231 may communicate the signals and/or record the measurements to facilitate assessing a health condition of the battery in order to determine whether to retire or remove the battery from a downhole drilling operation.

In some embodiments, the battery 220 includes a housing 222. The housing 222 may connect or secure the battery 220 to a drilling component. The housing 222 may contain or house one or more components of the battery 220. For example, the one or more energy cells 224 may be contained within the housing 222. The BMS 230 may also be contained within the housing 222. In this way, the energy cells 224 and the BMS 230 may be sealed inside of the battery 220. For example, the energy cells 224 and the BMS 230 may be included in the battery 220 as part of the manufacturing process of the battery 220 such that the energy cells 224 and the BMS 230 are sealed within the battery 220. In this way, the BMS 230 may be integrally formed within the battery 220, along with the energy cells 224.

In some embodiments, the BMS 230 may be positioned within the battery 220 near a top or an end cap of the battery 220. For example, the BMS 230 may be positioned above the energy cells 224. This may facilitate access to the energy cells 224 for the BMS 230 to monitor and/or control the energy cells 224. In some embodiments, the BMS is powered by the energy cells 224. For example, the BMS 230 may share circuitry with the energy cells 224 and may draw small amounts of power from the energy cells 224. This may facilitate one or more functions of the BMS 230 to monitor and/or control the energy cells 224. In some embodiments, the BMS 230 includes an independent power source (e.g., auxiliary battery) for powering the BMS 230 independent of the energy cells 224. For example, the BMS 230 may be separate or external from the circuitry of the energy cells 224. In some embodiments, the BMS 230 includes an energy harvester. For example, the energy harvester may collect and/or convert energy (e.g., heat, magnetic, RF, piezoelectric, Etc.) into electricity for powering the BMS 230.

In some embodiments, the BMS 230 may be included or installed in the battery 220 as part of a manufacturing of the battery 220. For example, the BMS 230 may be inserted and/or installed into the housing 222 with other components of the battery (e.g., the energy cells 224) and in this way may be sealed and/or integrally formed with the battery 220 when the battery 220 is manufactured. In some embodiments, the BMS 230 may be included or installed in the battery 220 after the battery 220 is manufactured. For example, the BMS 230 may be added to the componentry of an existing battery. In another example, the BMS 230 may replace one or more components of an existing battery. In this way, the BMS 230 may be included as part of a retrofit of an existing battery to provide a battery 220 in accordance with the techniques described herein.

The battery 220 may power one or more downhole electronic devices and monitor drilling parameters associated with the battery 220 through components that are contained within the battery 220 as a single sealed, integral unit. This may facilitate including the BMS 230 as part of a drilling system, as doing so may be as simple as inserting and/or connecting the battery 220 to the drilling component (or multiple batteries 220 at multiple components and/or locations of a drilling system). Removing and/or replacing the BMS 230 may be facilitated as well, by simply removing or replacing the battery 220. Further, the BMS 230 being physically contained within the battery 220 limits the potential for the data logged by the BMS 230 to be lost, misplaced, or incorrectly associated with a different battery as might be the case with a monitoring system that is, for example, a separate, standalone system. In this way, the battery 220 including the energy cells 224 and the BMS 230 may be a solitary, self-contained system.

In some embodiments, one or more components of the BMS 230 and/or the entirety of the BMS 230 may be external to the battery 220. For example, the BMS 230 may not be included within the housing 222 of the battery 220. The BMS 230 may be included on some other portion or at some other location of a drilling component. In this way, the BMS 230 may be separate from the battery 220, and the battery 220 may be removed or replaced independent of the BMS 230 (e.g., without removing or replacing the BMS 230).

FIG. 2-2 is a perspective view of the downhole tool battery 220 of FIG. 2-1. In some embodiments the housing 222 may include an inner portion 222-1 and an outer portion 222-2. The inner portion 222-1 may be a portion of the housing 222 which defines an inner structure of the housing 222. For example, the inner portion 222-1 may hold and/or support the energy cells 224. The inner portion 222-1 may hold and/or support the BMS 230. The outer portion 222-2 may be a portion of the housing 222 which defines an outer structure of the housing 222. For example, the outer portion 222-2 may be configured to connect or secure to a drilling component and in this way secure the battery 220 to the drilling component. The outer portion 222-2 may define an outer periphery of the battery 220. For example, the outer portion 222-2 may be substantially cylindrical in shape. The outer portion 222-2 may be an enclosed or partially enclosed shape. For example, the inner portion 222-1, the energy cells 224, and the BMS 230 may be completely enclosed in the outer portion 222-2. In this way, the energy cells 224, the inner portion 222-1, and the BMS 230 may be sealed inside of the battery 220.

In some embodiments, the housing 222 may include or incorporate one or more portions of the drilling component. For example, the housing 222 may include or be defined by an opening and/or a cavity in a drilling component (e.g., in a body of the drilling component). The energy cells 224 and/or the BMS 230 may be positioned within the cavity. In some embodiments, the cavity may include the inner portion 222-1 such that an inner structure is included, for example, to hold and/or support the energy cells 224 and/or the BMS 230. In some embodiments, the housing 222 may include a cover or a door. For example, the cavity may be positioned with an opening toward or at an outer surface of the drilling component, and the outer portion 222-2 may comprise a cover that encloses or seals the opening. In this way, the components of the battery 220 (e.g., the energy cells 224 and/or the BMS 230) may be contained or sealed within the cavity of the drilling component.

In some embodiments, the BMS 230 may include a silicon computer chip, or a printed circuit board ("PCB") 241. In some embodiments, the BMS 230 may be contained or disposed on the PCB 241. For example, as will be discussed herein in connection with FIG. 5, the electronic module 231, the health sensor 234, and any other components of the BMS 230 may be disposed on the PCB 241. In this way, the BMS 230 may be a system on a chip ("SoC") device. In some embodiments, the BMS 230 or one or more components of the BMS 230 may be contained on an application specific integrated circuit ("ASIC") chip. In some embodiments, one or more of the electrical components of the BMS may not be disposed on the PCB or may be included independent of the PCB 241. For example, one or more of the sensors of the health sensor 234 may be disposed elsewhere in the battery 220 apart from the PCB 241. In this way, the battery 220 may monitor and/or control one or more drilling parameters associated with the battery 220.

Figures 1, 3:
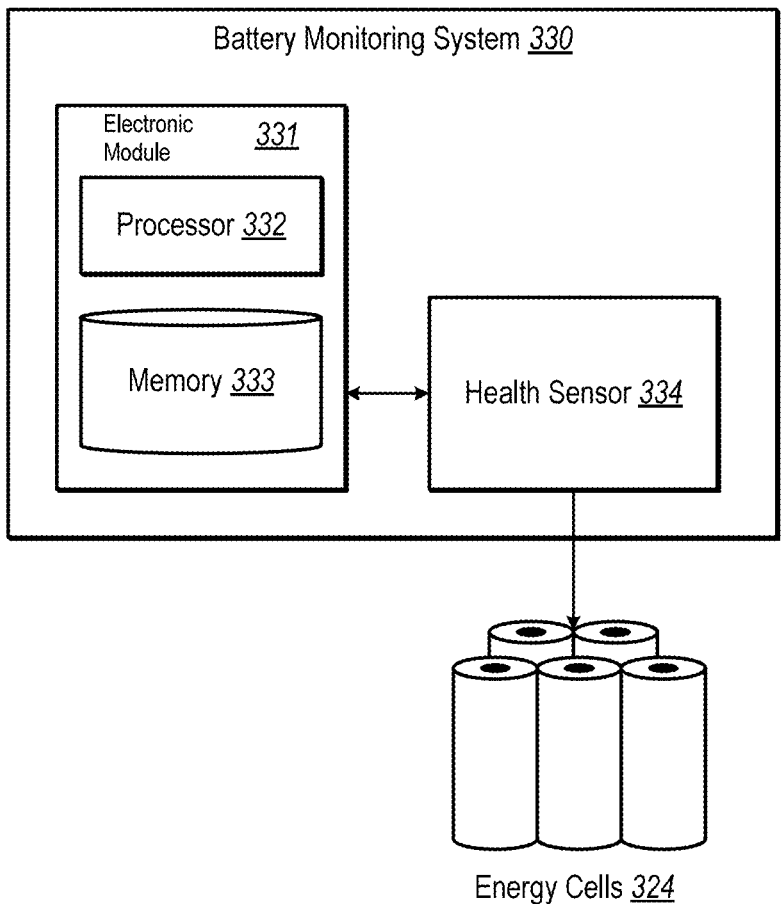
Figures 2, 3:
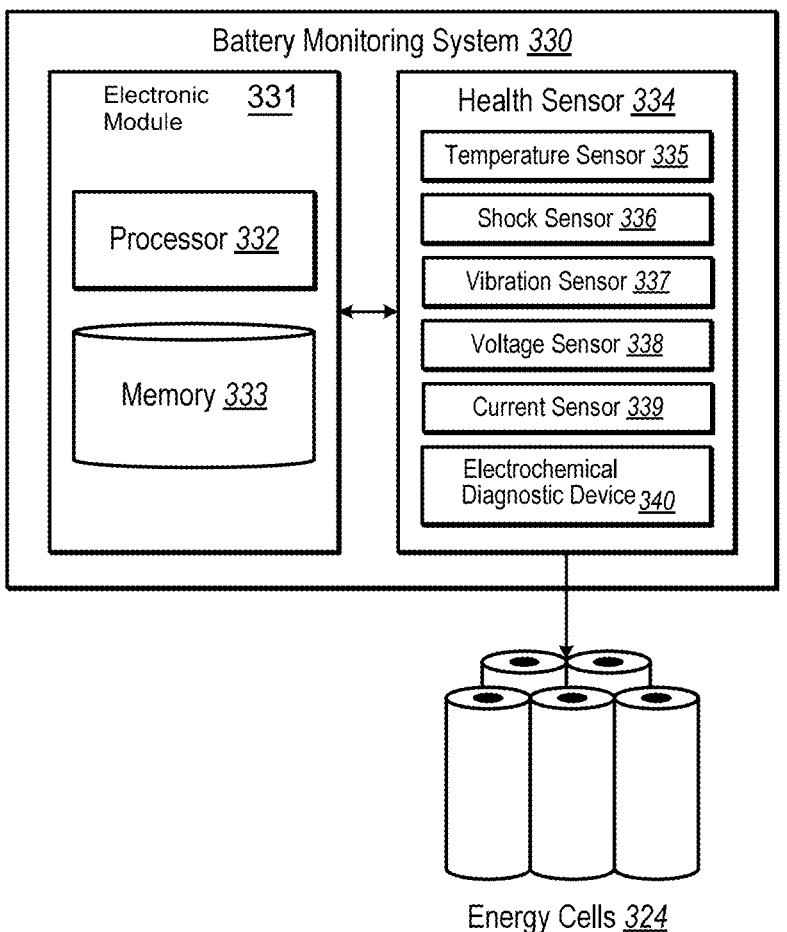
Figure 3:
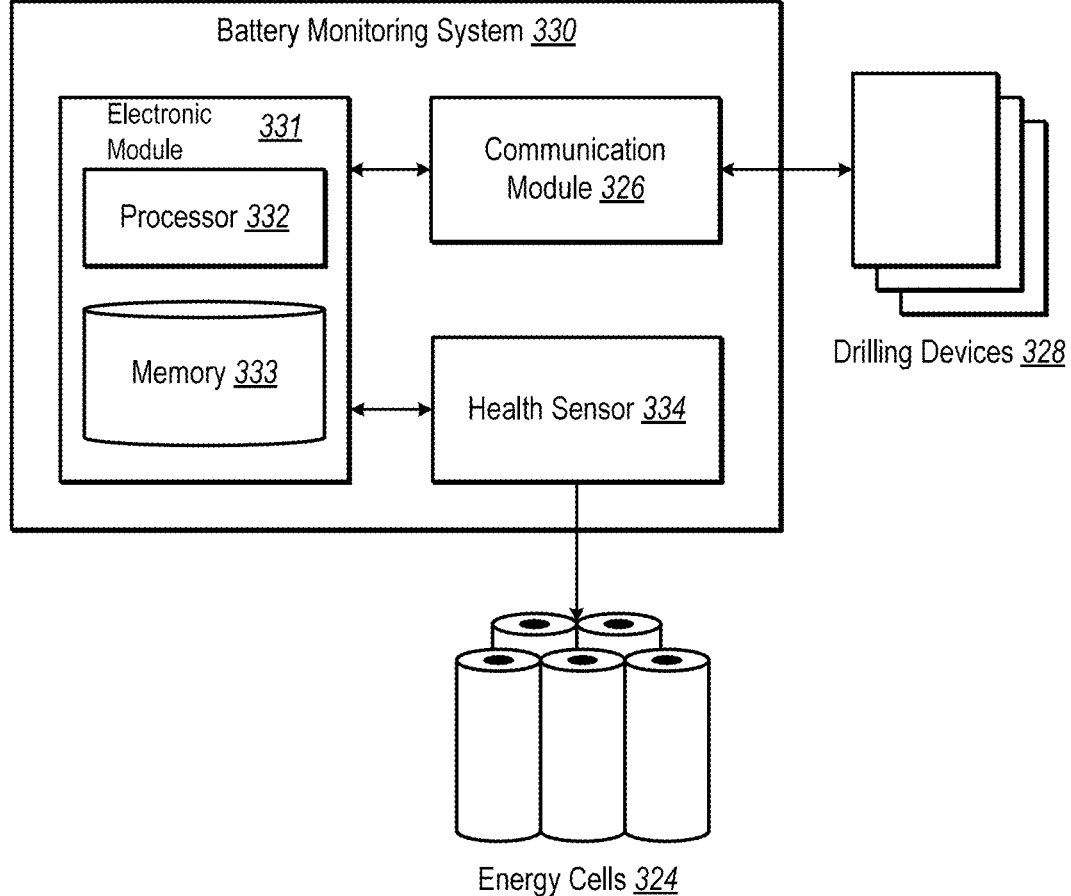

FIG. 3-1 is a block diagram of a BMS 330, according to at least one embodiment of the present disclosure. As described herein, in some embodiments, the BMS 330 includes an electronic module 331, in a non-limiting example, a datalogger, and a health sensor 334. The health sensor 334 may be configured to monitor and/or sense one or more drilling parameters (e.g., temperature, vibration, shock, etc.) associated with one or more energy cells 324 of a downhole battery and/or one or more drilling parameters associated with the battery generally. In some embodiments, the health sensor 334 monitors and/or senses one or more drilling parameters during downhole drilling operations.

In some embodiments, the electronic module 331 receives the health measurements from the health sensor 334. For example, as will be described herein in detail, the health sensor 334 may include a temperature sensor, a shock sensor, a vibration sensor, a voltage sensor, a current sensor, in a non-limiting example, an electrochemical device, electrochemical sensor, electrochemical diagnostic device, any other sensor for sensing parameters associated with the health of the energy cells 324, and combinations thereof. In some embodiments, the health sensor 334 senses one or more parameters exhibited by the battery or drilling parameters experienced by the battery and communicates electronic data to the electronic module 331 corresponding to the sensed parameters. The health measurements may be associated with an indication of a health condition of the battery (e.g., a health of the energy cells 324). For example, in some situations an elevated temperature may damage the energy cells 324 (e.g., a temperature of the environment and/or a surface temperature of the energy cells 324). In another example, elevated and/or repeated shock and/or vibration may damage the energy cells 324. In some embodiments, the health sensor 334 may take health measurements (e.g., during downhole drilling operations) corresponding to these damaging parameters. In some embodiments, the electronic module may communicate one or more signals corresponding to the health measurements (e.g., the damaging parameters sensed by the health sensor 334) such that the health condition may be determined. For example, the electronic module may be configured to light up a light, display a readout on a display, toggle a switch, make a sound, vibrate, send a wireless signal (e.g., radio-frequency signal), otherwise provide a signal, and combinations thereof. These signals may be communicated in response to the health sensor sensing a parameter over a threshold value. For example, one or more signals may be an indication that the battery exceeded a threshold temperature. One or more signals may be an indication that the battery experienced a threshold level of shock. The signals may indicate any relevant metric and/or parameter and combinations thereof. The signals in this way may facilitate, for example, an operator at the surface identifying that the battery has experienced drilling parameters associated with damage to the battery. This may facilitate the operator determining the health condition of the battery or determining whether to reuse the battery.

In some embodiments, the signals communicated by the electronic module 331 may be an indication of the health condition. For example, based on the health measurements, the electronic module may determine the health condition of the battery (e.g., determine whether the battery can be rerun) and may communicate one or more signals corresponding to the health condition. In this way, the signals may facilitate, for example, an operator at the surface identifying whether the battery may be reused on a subsequent downhole drilling operation. In this way, the electronic module 331 may communicate one or more signals indicating one or more parameters exhibited by or drilling parameters experienced by the battery and/or one or more signals indicating the health condition of the battery.

In some embodiments, the one or more signals may be the health measurements. For example, in some embodiments, the electronic module 331 includes a processor 332 and memory 333. The processor 332 may be a microcontroller or microprocessor integrally disposed on a PCB of the BMS 330. The memory 333 may be non-volatile memory such that the information stored thereon may be preserved in the event of power loss. The processor 332 may communicate with the health sensor 334 to receive the health measurements. The processor 332 may record the health measurements, for example, associated with instances where the temperature exceeded a threshold value. In other examples, a similar technique may be performed with respect to excessive vibration, shock, rotation, etc. The processor 332 may record, write, or log the health measurements to the memory 333 to create a backlog of health measurements. As described herein, the processor 332 may record the health measurements periodically or continuously. The processor 332 may record only those health measurements exceeding a threshold value or may record any health measurement (e.g., any parameter of any value as discussed herein). In this way, the electronic module 331 may create a backlog of health measurements that may be accessible (e.g., communicated by the electronic module 331) for determining the health condition of the battery.

The memory 333 has been described herein as nonvolatile memory such as flash memory. It should be understood, however, that the memory 333 may be any type of hardware storage device. For example, a hardware storage device is any non-transient computer readable medium that may store instructions or information thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media.

The health measurement backlog may facilitate determining the health condition of the battery. The health condition may correspond to a capability of the battery to function properly during re-use or during a rerun of the battery in a subsequent downhole drilling operation. For example, the health condition may indicate or may correspond to a state of charge ("SOC") of the battery, a degradation of the battery, a state of health ("SOH") of the battery (e.g., capacity of the battery to hold a specific level of charge), a level of damage sustained by the battery, any other factor indicative of a functionality of the battery, and combinations thereof. In some embodiments, the health condition is determined once the drilling component (and therefore the battery) has been tripped or brought to the surface. For example, the electronic module 331 may communicate (e.g., upload) the backlog in order that it might be analyzed to resolve the health condition. In some embodiments, the electronic module 331 communicates the backlog to another computing device. In some embodiments, a software or program of another computing device may determine the health condition based on the backlog. In some embodiments, an operator may determine the health condition based on the backlog.

In some embodiments, the electronic module 331 may determine the health condition of the battery. The electronic module 331 may determine the health condition based on one or more of the drilling parameters or health measurements. For example, the electronic module 331 may include one or more algorithms (e.g., firmware) for analyzing the health measurements recorded in the backlog. In some embodiments, the electronic module 331 may, through control logic, analyze temperature measurements, shock measurements, etc. from the health sensor 334 and may make a determination of the health condition. In some embodiments, the electronic module 331 may perform a coulomb counting method to determine the health condition of the battery. For example, based on current measurements from the health sensor 334, the electronic module 331 may integrate over time a discharging current of the battery and, for example, estimate a SOC of SOH of the battery. In this way, the electronic module 331 may consider a wide variety of metrics in order to make a more sophisticated determination of the health condition of the battery.

As mentioned above, the electronic module 331 may communicate a signal indicating the health condition of the battery or indicating whether the battery may be rerun in a subsequent drilling operation. In some embodiments, the signal may be based on a determination of the health condition by a machine learning model. For example, the health measurements may be inputs to a machine learning model for more accurately determining battery health. A machine learning model may be trained to receive a plurality of the health measurements and metrics described herein (e.g., those recorded by the electronic module 331) and to provide a sophisticated prediction of the health condition of the battery. In some embodiments, the machine learning model may be implemented by the electronic module 331. In some embodiments, the machine learning model may be implemented by a computing device at the surface.

The following example formulas illustrate an example implementation of one or more aspects of the machine learning model. A parameter health condition value (e.g., $Temp_{HC}$, $Shk_{HC}$, $Vib_{HC}$, etc.) may be determined for one or more of the drilling parameters discussed herein associated with battery health. The parameter health condition value may be determined based on a variety of weighted values corresponding to the parameter. For example, the formulas may be:

$$Temp_{HC} = W_1(Temp_{Max}) + W_2(Temp_{Ave}) +$$
$$W_3(Temp_{Mean}) + W_4(Temp_{SDV}) + W_5(Temp_{AV>SDV})$$
$$Shk_{HC} = W_6(Shk_{Max}) + W_7(Shk_{Ave}) + W_8(Shk_{Mean}) +$$
$$W_9(Shk_{SDV}) + W_{10}(Shk_{AV>SDV})$$
$$Vib_{HC} = W_{11}(Vib_{Max}) + W_{12}(Vib_{Ave}) + W_{13}(Vib_{Mean}) +$$
$$W_{14}(Vib_{SDV}) + W_{15}(Vib_{AV>SDV})$$

Temp=temperature; Shk=shock; Vib=vibration frequency [value]$_{Max}$=maximum value; [value]$_{Ave}$=average value; [value]$_{Mean}$=mean value; [value]$_{SDV}$=standard deviation of measured values; [value]$_{AV>SDV}$=Average of values over the standard deviation W #=corresponding weight applied to value Based on the parameter health condition values, an overall health condition value (HC) of the battery may be determined, for example, through the following formula:

$$HC = Temp_{HC} + Shk_{HC} + Vib_{HC}$$

The health condition may be compared to one or more predetermined thresholds in order to resolve the health condition of the battery (e.g., to determine whether the battery can be rerun). These example formulas may include any number of weightings and/or values associated with any number of drilling parameters as discussed herein. In addition, the overall health condition value may be determined with any number of formulas in place or in addition to those provided in the example above.

A machine learning model may be trained to implement (or modify) one or more of these formulas in order to predict the health condition of the battery. For example, the machine learning model may be trained to detect, classify, and quantify a dynamic health condition value. The machine learning model may be provided training data. For example, one or more drilling parameter values (e.g., max, ave, mean, etc. for Temp, Shk, Vib, etc.) may be provided as training characteristics and an overall health condition (e.g., healthy or not healthy) may be provided as a ground truth. The machine learning model may be a regression model and may implement one or more machine learning network layers (e.g., neural network layers). For example, the machine learning model may include input layers, hidden layers, and output layers. The input layers may encode drilling parameter features corresponding to the input drilling parameters into a numerical representation. The hidden layers may map or encode the input drilling parameters to feature vectors. The output layers may process the feature vectors to decode health condition information from the input drilling parameters to determine or predict a health condition. A loss model may determine an error or loss amount corresponding to the predicted health condition that the machine learning model outputs (e.g., by comparing to the ground truth health condition). The loss model may provide feedback to the machine learning model to tune the machine learning model (e.g., tune the one or more layers). In this manner, the machine learning model may be iteratively tuned or trained to learn a set of best-fit parameters (e.g., weightings, drilling parameters and/or parameter health condition values to consider, thresholds, etc.) that accurately generates the overall health condition of the battery. In this way, the health condition may be determined based on the health measurement taken by the BMS 330.

Determining the health condition (via machine learning or otherwise) based on the backlog of health measurements may provide a more accurate indication of the capacity and/or functionality of the battery. For example, the health condition based on the sophisticated metrics described herein may indicate with a higher degree of confidence whether a battery can be rerun when compared to conventional methods such as SOC or SOH alone. This may provide significant cost benefits. For example, the health condition may indicate that a battery may be used longer than was otherwise thought possible, reducing costs associated with replacement batteries. In another example, the health condition may prevent batteries from being used downhole where they might underperform and/or fail causing costly downtime of drilling equipment. In yet another example, the health condition may more accurately indicate the lifetime of a battery, reducing the environmental impact of using additional batteries.

In some embodiments, the electronic module 331 periodically records the health measurements. For example, the health sensor 334 may continuously sense the health measurements of the energy cells 324, and the electronic module 331 may record only those health measurements that exceed a threshold value. In another example, the electronic module 331 may periodically record health measurements based on a schedule or a time interval. These techniques may also be combined, for instance, to periodically record health measurements based on a time interval, in addition to capturing health measurements that exceed a threshold value. In some embodiments, the electronic module 331 constantly records the health measurements. For example, the BMS 330 may be initialized upon commencement of a drilling operation. The electronic module 331 may continuously record the health measurements sensed by the health sensor (e.g., temperature, shock, vibration). This continuous backlog may provide a comprehensive view of the dynamics associated with the drilling operation. In this way, the electronic module 331 may create a backlog of health measurements indicating whether the battery encountered or experienced downhole dynamics corresponding to damage to the energy cells 324.

In some embodiments, the backlog of health measurements may facilitate determining whether the battery may be reused or rerun in a subsequent drilling operation. For example, periodically, drilling components may be tripped or removed from the borehole. The battery powering electronic devices of these drilling components may be removed, and the backlog retrieved or downloaded in order to determine the health condition of the battery. In some situations, the backlog of health measurements may facilitate research and/or development of downhole batteries. For example, the battery (and more specifically the BMS 330) may facilitate quantifying and analyzing the effects of drilling parameters such as elevated temperatures, high frequency vibrations, elevated and/or repeated shocks, etc. on battery performance. This may be in connection with training or tuning a machine learning model to predict the health condition of the battery, as discussed herein. In this way, a backlog of health measurements may be compiled corresponding to drilling parameters of interest associated with the battery.

In some embodiments, the backlog may comprise the health measurements from the health sensor 334. For example, the electronic module 331 may record a specific value (e.g., 140° C., 50 g, etc.) of an observed drilling parameter. The electronic module 331 may record a date and/or time associated with the drilling parameter, a number of instances of the observed parameter, a location or depth associated with the drilling parameter, any other information related to the drilling parameter and combinations thereof. In some embodiments, the electronic module 331 may record all health measurements sensed by the health sensor 334 at each measurement period or interval. For example, the electronic module 331 may record each of a temperature, shock, and vibration periodically at a given time interval. In another example, the electronic module 331 may record each of the temperature, shock, and vibration when one of these drilling parameters exceeds a threshold value. In some embodiments, the electronic module 331 may record only the health measurements associated with one drilling parameter at a time, or one drilling parameter for a given instance. For example, each drilling parameter (e.g., temperature) may have a time interval (e.g., every 30 minutes) associated with it and the electronic module 331 may record just the health measurement associated with that drilling parameter at that given time interval. The electronic module may record just the health measurements associated with a drilling parameter that triggers a recording due to exceeding a threshold value. In this way, the backlog may comprise a compilation of sophisticated information such as the actual health measurements sensed by the health sensor 334 and/or other advantageous information.

In some embodiments, the backlog may comprise more basic information related to the health measurements. For example, the electronic module 331 may record an indication of an instance or a number of instances where a drilling parameter exceeded a threshold value (e.g., an amount of times temperature exceeded 135° C.). This may save on energy consumption, processing requirements, size of electrical components, simplicity, etc. while still providing valuable information related to the health condition of the battery. In some embodiments, the backlog may comprise even more basic information related to the health measurements, such as a flag indicating a drilling parameter exceeded a threshold value. For example, the electronic module 331 may record a value in an alphanumeric or hexadecimal code which may provide a simple indication (such as through a lookup table) that the parameter exceeded, at least once, the threshold value. This may help to further increase the efficiency and/or simplicity gains highlighted above.

In some embodiments, the electronic module 331 will not log or record the health measurements. The electronic module 331 may be configured to indicate the health condition of the battery. For example, the electronic module 331 may receive the health measurements from the health sensor 334 and may produce and/or display an indication of the health measurement, such as lighting a light, displaying a readout on an analogue or digital display, toggling a switch, making a sound, vibrating, sending a wireless signal (e.g., radio-frequency signal), otherwise providing a signal, and combinations thereof. In this way, the electronic module 331 may indicate the health condition of the battery, which may be in place of or in addition to logging or recording information.

In some embodiments, the BMS 330 may operate in a sleep state. For example, one or more components of the BMS 330 (e.g., the electronic module 331, the health sensor 334) may operate in a low power mode. In the low power mode, the electronic module 331 may be configured to not record any health measurements from the health sensor 334. In the low power mode, the health sensor 334 may be configured to not take any health measurements. In this way, the BMS 330 requires a minimal amount of electricity while in the sleep state.

In some embodiments, the BMS 330 may have a sleep state current draw of less than 1 mA. In some embodiments, the sleep state current draw may be in a range having an upper value, a lower value, or upper and lower values including any of 0.01 mA, 0.02 mA, 0.03 mA, 0.04 mA, 0.05 mA, 0.06 mA, 0.07 mA, 0.08 mA, 0.09 mA, 1 mA, 2 mA, 3 mA, 4 mA, or any value therebetween. For example, the sleep state current draw may be greater than 0.1 mA. In another example, the sleep state current draw may be less than 4 mA. In yet another example, the sleep state current draw may be between 0.1 mA and 4 mA. In some embodiments, it may be critical that the sleep state energy draw be less than 1 mA in order to use a minimal amount of electricity without draining the downhole battery before it can be used in a downhole drilling component. In some embodiments, in the sleep state, the sleep state current draw may be at or below the self-discharge rate of the battery. This may help to increase the usable life of the battery.

In accordance with at least one embodiment of the present disclosure, when the BMS 330 is in the sleep state, the health sensor 334 may be configured to monitor and/or sense for trigger events associated with one or more parameters of the battery. For example, the health sensor 334 may monitor for a trigger event of a temperature, a shock, a vibration, gyroscopic measurement (e.g., a sensed rotation), or a current draw from the battery above a threshold value (or any other parameter). In another example, the health sensor 334 may monitor for a trigger event of a received and/or transmitted radio frequency signal, and/or Bluetooth signal. In some embodiments, the health sensor 334 sensing the trigger event may wake the BMS 330 to an active state. For example, the BMS 330 may operate in the low power mode or sleep state until the health sensor 334 detects the trigger event. The health sensor 334 may be configured as an interrupt trigger (e.g., through a circuitry or control logic of the health sensor 334) to wake the BMS 330 to the active state in order that the BMS 330 may perform the functions as discussed herein. The trigger event may correspond to a drilling component performing a downhole drilling operation. For example, the trigger event may be a detection of significant dynamics of a drilling component (e.g., significant accelerations, vibrations, etc.), or a certain current draw from the battery. In this way, the BMS 330 may automatically wake to the active state based on drilling activities being performed.

In some embodiments, the BMS 330 may have an active state current draw of 5 mA. In some embodiments, the active state current draw may be in a range having an upper value, a lower value, or upper and lower values including any of 1 mA, 2 mA, 3 mA, 4 mA, 5 mA, 6 mA, 7 mA, 8 mA, 9 mA, 10 mA, 15 mA, 20 mA, or any value therebetween. For example, the active state current draw may be greater than 1 mA. In another example, the active state current draw may be less than 20 mA. In yet another example, the active state current draw may be between 1 mA and 20 mA. In some embodiments, it may be critical that the active state current draw be no more than 5 mA. In some embodiments, it may be critical that the active state current draw be between 4 mA and 5 mA. In this way the BMS 330 may be powered by the downhole battery without impacting the ability for the battery to power an electronic device of a downhole component.

In some embodiments, the active state current draw may be less than an amount of current drawn by the tool. In some embodiments, the active state current draw may be significantly less than the amount of current drawn by the tool. For example, the active state current draw may be less than 50%, less than 40%, less than 30%, less than 20%, less than 10%, less than 5%, less than 1%, less than 0.1%, less than 0.01%, less than 0.001%, or any value therebetween of the amount of current drawn by the tool.

As discussed herein, the BMS 330 may be included in the battery during manufacturing of the battery. Additionally, the BMS 330 may be powered by the battery. The BMS 330 operating in the sleep state has the advantage of not draining significant energy from the battery. This may facilitate the manufacture of the battery with the BMS 330 sealed within by reducing the possibility of BMS 330 draining the battery before it can be used in a downhole drilling component. The BMS 330 automatically waking to the active state also facilitates the manufacture of the BMS 330 with the battery as a sealed unit, as little to no initialization of the BMS 330 is required for the BMS 330 to begin performing the battery monitoring functions described herein.

In some embodiments, the BMS 330 may be configured to operate in a deep sleep state. For example, in the deep sleep state, the BMS 330 may be powered off and/or draw no power from the battery. In some embodiments, the BMS 330 is initialized (e.g., turned on) from the deep sleep state to the sleep state. For example, when the battery is manufactured, the BMS 330 may be configured in the deep sleep state. This may be to prevent any power being drained from the battery. When the battery is shipped to or arrives at a drilling site, the BMS 330 may be initialized to the sleep state, for example, before being inserted or connected to a drilling component. The BMS 330 may then wake to the active state when detecting operation of drilling activities, as described herein. In this way, the battery may be manufactured, shipped, and stored, without the BMS 330 drawing any power from the battery, and the BMS 330 may be initialized to perform the battery monitoring functions as described herein.

FIG. 3-2 is a block diagram of the BMS 330 of FIG. 3-1. As discussed herein, in some embodiments the BMS 330 includes a health sensor 334 for monitoring the health of a downhole battery, or more specifically, the health of one or more energy cells 324 of the downhole battery. The health sensor 334 may include one or more sensors for taking health measurements of one or more parameters exhibited by or drilling parameters experienced by the battery. In some embodiments, each of the one or more sensors is a component included on a PCB of the BMS 330. In some embodiments, one or more of the sensors of the health sensor 334 is a component included in the battery at a location or position that is independent of a PCB of the BMS 330. In this way, one or more sensors of the health sensor may take the health measurements corresponding to one or more drilling parameters associated with a health of the battery.

In some embodiments, the health sensor 334 includes a temperature sensor 335 for taking temperature measurements. The temperature sensor 335 may sense a battery temperature, for example, of a surface of the energy cells 324. Alternatively, or additionally, the temperature sensor 335 may sense an environment temperature around or about the energy cells 324 and/or the battery (e.g., a temperature of an environment the battery is subject to). In some embodiments, the temperature sensor 335 includes a plurality of temperature sensors for taking a plurality of temperature measurements of different components and/or locations of the battery. In some embodiments, the temperature sensor may be a thermocouple, a resistance temperature detector (RTD), a thermistor, an electromechanical sensor (e.g., thermostat), an infrared sensor, a semiconductor based integrated circuit temperature sensor, any other temperature sensor for taking temperature measurements as described herein, and combinations thereof. In this way, the health measurements measured by the health sensor 334 may be temperature measurements of a temperature of the battery.

In some embodiments, the electronic module 331 communicates signals corresponding to the temperature measurements. For example, the electronic module may record the temperature measurements and may communicate the recorded temperature measurements. The electronic module 331 may periodically or continuously record the temperature measurements, as discussed herein. In another example, the electronic module 331 may record temperature measurements that exceed a threshold temperature. The electronic module 331 may communicate one or more signals, as described herein, corresponding to a threshold temperature. The threshold temperature may correspond to a temperature at which the battery and/or the energy cells 324 experience damage or degradation. In some embodiments, the threshold temperature is 135° C. In some embodiments, the threshold temperature is in a range having an upper value, a lower value, or upper and lower values including any of 110° C., 115° C., 120° C., 125° C., 130° C., 135° C., 140° C., 145° C., 150° C., 155° C., 160° C., 165° C., 170° C., 175° C., 180° C., or any value therebetween. For example, the threshold temperature may be greater than 110° C. In another example, the threshold temperature may be less than 180° C. In yet another example, the threshold temperature may be between 110° C. and 180° C. In some embodiments, it may be critical that the threshold temperature be between 135° C. and 150° C. to ensure that potential damage to the battery due to temperature is reported and/or logged by the electronic module 331.

In some embodiments, the battery may be configured to operate at an operating temperature. For example, one or more of the electronic module 331, the health sensor 334 (including the one or more sensors that are included in the health sensor 334), the energy cells 324, and any other component of the battery may be configured to operate at elevated temperatures typical of a downhole drilling environment. For example, the operating temperature may be 120° C. In some embodiments, the operating temperature may be in a range having an upper value, a lower value, or upper and lower values including any of −40° C., −30° C., −20° C., 0° C., 20° C., 40° C., 80° C., 90° C., 100° C., 110° C., 120° C., 130° C., 140° C., 150° C., 160° C., 170° C., 180° C., 190° C., 200° C., or any value therebetween. For example, the operating temperature may be greater than −40° C. In another example, the operating temperature may be less than 200° C. In yet another example, the operating temperature may be between −40° C. and 200° C. In some embodiments, it may be critical that the operating temperature be no less than 100° C. to ensure that the various components of the battery (e.g., the energy cells 324) may withstand the elevated temperatures present in a downhole drilling environment. Specifically, it may be critical that the BMS 330 is able to function properly without becoming damaged at the elevated temperatures present in a downhole drilling environment.

In some embodiments, the health sensor 334 includes a shock sensor 336. The shock sensor 336 may take shock measurements of a shock experienced by the battery. For example, during downhole drilling operations, one or more components of a drill string or BHA may encounter different earthen formations which exhibit varying physical properties. The drilling and/or removal of the earthen formations to form the borehole may cause varying levels of impacts, or shock to one or more components of the drill string and/or BHA. The impact or shock may correspond to a sudden acceleration of a given magnitude. In some situations, the battery included in one of these components may similarly experience the impact or shock. Impacts of a certain magnitude and/or repeated impacts may cause damage to the battery. The shock sensor 336 may measure the shocks or impacts of the battery to facilitate determining whether the battery has been damaged or degraded due to the shocks or impacts. In some embodiments, the shock sensor 336 may be an inertial sensor, such as a single axis accelerometer, a multi-axis accelerometer, or a gyroscope. The shock sensor 336 may be any other sensor suitable for taking shock measurements as described herein. In some embodiments, the shock sensor 336 includes a plurality of sensors for taking a plurality of shock measurements of different components and/or relative to different axes of the battery. In this way, the health measurements measured by the health sensor 334 may be shock measurements of a shock of the battery.

In some embodiments, the electronic module 331 communicates signals corresponding to the shock measurements. For example, the electronic module 331 may periodically or continuously record shock measurements, as discussed herein, and may communicate the recorded shock measurements. In another example, the electronic module 331 may record shock measurements that exceed a threshold acceleration. In another example, the electronic module 331 may communicate one or more signals, as described herein, corresponding to a threshold acceleration. In some embodiments, the threshold acceleration corresponds to a magnitude of shock at which the battery and/or the energy cells 324 experience damage or degradation. In some embodiments, the threshold acceleration corresponds to a magnitude of shock which may not necessarily damage the battery and/or the energy cells 324 from one instance, but at which repeated instance or repeated shocks of that magnitude cause damage or degradation. In some embodiments, the threshold acceleration is 50 g (e.g., 50 times gravitational acceleration). In some embodiments, the threshold acceleration is in a range having an upper value, a lower value, or upper and lower values including any of 5 g, 10 g, 20 g, 30 g, 40 g, 50 g, 60 g, 70 g, 80 g, 90 g, 100 g, 150 g, 200 g, or any value therebetween. For example, the threshold acceleration may be greater than 5 g. In another example, the threshold acceleration may be less than 200 g. In yet another example, the threshold acceleration may be between 5 g and 200 g. In some embodiments, it may be critical that the threshold acceleration be no greater than 40 g to ensure that potential damage to the battery due to shock be recorded and/or logged by the electronic module 331.

In some embodiments, the battery may be configured to operate at an operating acceleration. For example, one or more of the electronic module 331, the health sensor 334 (including the one or more sensors that are included in the health sensor 334), the energy cells 324, and any other component of the battery may be configured to withstand accelerations or shocks typical of a downhole drilling environment. For example, the operating acceleration may be 50 g. In some embodiments, the operating acceleration may be in a range having an upper value, a lower value, or upper and lower values including any of 5 g, 10 g, 20 g, 30 g, 40 g, 50 g, 60 g. 70 g, 80 g, 90 g, 100 g. 150 g. 200 g, or any value therebetween. For example, the operating acceleration may be greater than 5 g. In another example, the operating acceleration may be less than 200 g. In yet another example, the operating acceleration may be between 5 g and 200 g. In some embodiments, it may be critical that the operating acceleration be no less than 200 g to ensure that the various components of the battery, may withstand accelerations or shocks present in a downhole drilling environment. Specifically, it may be critical that the BMS 330 be able to withstand, and the shock sensor 336 be able to measure, accelerations of up to 200 g in order to properly measure and/or log impacts and/or shocks to the battery that may damage the battery.

In some embodiments, the health sensor 334 includes a vibration sensor 337. The vibration sensor 337 may take vibration measurements of a vibration experienced by the battery. In some embodiments, the vibration sensor 337 includes a plurality of sensors for taking a plurality of vibration measurements of different components and/or relative to different axes of the battery. In some situations, one or more components of the drill string or the BHA encountering the earthen formation may cause one or more drilling components to vibrate. In some situations, one or more components of the drill string may be unbalanced which may cause one or more drilling components to vibrate due to a rotation of the drill string. In some situations, the battery included in one of these components may similarly experience vibrations. For example, the battery may experience one or more of axial vibrations, lateral vibrations, and torsional vibrations (and combinations thereof). Vibrations of a certain amplitude and/or frequency may cause damage to the battery. The vibration sensor 337 may measure the vibrations of the battery to facilitate determining whether the battery has been damaged or degraded due to the vibrations. In some embodiments, the vibration sensor 337 may be a displacement sensor, velocity sensor, accelerometer, gyroscope, strain gauge, piezoelectric sensor, piezoresistive sensor, capacitive sensor, microelectromechanical system (MEMS) sensor, microphone sensor, any other sensor suitable for measuring vibrations of the battery as described herein, and combinations thereof. In this way, the health measurements measured by the health sensor 334 may be vibration measurements of a vibration of the battery. In some embodiments, the vibration measurements may be measured in the time domain. In some embodiments, the vibration measurement may be measured in the frequency domain. In some embodiments, the vibration measurements may be a root mean square (RMS) of the observed and/or sensed vibrations.

In some embodiments, the electronic module 331 communicates signals corresponding to vibration measurements associated with an amplitude of the vibrations and may communicate the recorded vibration measurements. For example, the electronic module 331 may periodically or continuously record the vibration measurements corresponding to amplitude, as discussed herein. In another example, the electronic module 331 may record vibration measurements that exceed a threshold amplitude. In another example, the electronic module 331 may communicate one or more signals, as discussed herein, corresponding to a threshold amplitude. In some embodiments, the threshold amplitude corresponds to a displacement or an intensity of a vibration at which the battery and/or the energy cells 324 experience damage or degradation. In some embodiments the threshold amplitude is 0.7 in. In some embodiments, the threshold amplitude may be in a range having an upper value, a lower value, or upper and lower values including any of 0.005 in., 0.05 in., 0.1 in., 0.2 in., 0.3 in., 0.4 in., 0.5 in., 0.6 in., 0.7 in., 0.8 in., 0.9 in., 1 in., 2 in., 3 in., 4 in., 5 in., or any value therebetween. For example, the threshold amplitude may be greater than 0.05 in. In another example, the threshold amplitude may be less than 5 in. In yet another example, the threshold amplitude may be between 0.005 in. and 5 in. In some embodiments, it may be critical that the threshold amplitude be less than 0.5 in. to ensure that potential damage to the battery due to vibration be recorded and/or logged by the electronic module 331.

In some embodiments, the battery may be configured to operate at an operating amplitude. For example, one or more of the electronic module 331, the health sensor 334 (including the one or more sensors that are included in the health sensor 334), the energy cells 324, and any other component of the battery may be configured to withstand vibrations with an amplitude typical of a downhole drilling environment. For example, the operating amplitude may be 1 in. In some embodiments, the operating amplitude may be in a range having an upper value, a lower value, or upper and lower values including any of 0.05 in., 0.1 in., 0.2 in., 0.3 in., 0.4 in., 0.5 in., 0.6 in., 0.7 in., 0.8 in., 0.9 in., 1 in., 2 in., 3 in., 4 in., 5 in., or any value therebetween. For example, the operating amplitude may be greater than 0.05 in. In another example, the operating amplitude may be less than 5 in. In yet another example, the operating amplitude may be between 0.05 in. and 5 in. In some embodiments, it may be critical that the operating amplitude be no less than 5 in. to ensure that the various components of the battery may withstand the vibrations present in a downhole drilling environment. Specifically, it may be critical that the BMS 330 be able to withstand, and the vibration sensor 337 be able to measure, vibrations with an amplitude of up to 5 in. in order to properly measure and/or log vibrations of the battery that may damage the battery.

In some embodiments, the electronic module 331 communicates signals corresponding to vibration measurements associated with a frequency of the vibrations. For example, the electronic module 331 may periodically or continuously record the vibration measurements corresponding to frequency, as discussed herein, and may communicate the recorded vibration measurements. In another example, the electronic module 331 may record vibration measurements that exceed a threshold frequency. In another example, the electronic module 331 communicates one or more signals, as described herein, corresponding to a threshold frequency. In some embodiments, the threshold frequency corresponds to a speed or a velocity of the vibrations at which the battery and/or the energy cells 324 experience damage or degradation. In some embodiments the threshold frequency is 10 Hz. In some embodiments, the threshold amplitude may be in a range having an upper value, a lower value, or upper and lower values including any of 0.5 Hz, 1 Hz, 2 Hz, 3 Hz, 4 Hz, 5 Hz, 10 Hz, 20 Hz, 30 Hz, 40 Hz, 50 Hz, 100 Hz, 200 Hz, 500 Hz, 1 kHz, 2 kHz, 5 kHz, 10 kHz, or any value therebetween. For example, the threshold frequency may be greater than 1 Hz. In another example, the threshold frequency may be less than 10 KHz. In yet another example, the threshold frequency may be between 0.5 Hz and 10 kHz. In some embodiments, it may be critical that the threshold amplitude be less than 50 Hz to ensure that potential damage to the battery due to vibration be recorded and/or logged by the electronic module 331.

In some embodiments, the battery may be configured to operate at an operating frequency. For example, one or more of the electronic module 331, the health sensor 334 (including the one or more sensors that are included in the health sensor 334), the energy cells 324, and any other component of the battery may be configured to withstand vibrations with a frequency typical of a downhole drilling environment. For example, the operating frequency may be 50 Hz. In some embodiments, the operating frequency may be in a range having an upper value, a lower value, or upper and lower values including any of 0.5 Hz, 1 Hz, 2 Hz, 3 Hz, 4 Hz, 5 Hz, 10 Hz, 20 Hz, 30 Hz, 40 Hz, 50 Hz, 100 Hz, 200 Hz, 500 Hz, 1 kHz, 2 kHz, 5 kHz, 10 kHz, or any value therebetween. For example, the operating frequency may be greater than 0.5 Hz. In another example, the operating frequency may be less than 10 kHz. In yet another example, the operating frequency may be between 0.5 Hz and 10 kHz. In some embodiments, it may be critical that the operating frequency be no less than 500 Hz to ensure that the various components of the battery may withstand the vibrations present in a downhole drilling environment. Specifically, it may be critical that the BMS 330 be able to withstand, and the vibration sensor 337 be able to withstand, vibrations with a frequency of at least 500 Hz in order to properly measure and/or log vibrations of the battery that may damage the battery.

In some embodiments, the health sensor 334 includes a voltage sensor 338. The voltage sensor 338 may take voltage measurements of the voltage potential of the battery (more specifically, of the energy cells 324 of the battery). In some embodiments, the voltage sensor 338 includes a plurality of sensors for taking a plurality of voltage measurements such as, for example, a voltage of each of the one or more energy cells 324. As discussed herein, the battery may be used to power one or more electronic devices of a drilling component. The voltage measurements may correspond to a SOC of the battery, a SOH of the battery, or an ability of the battery to provide electricity to power the electronic devices. As discussed herein, one or more drilling parameters of the downhole drilling environment may affect the health of the battery, and the voltage measurements may facilitate determining the health condition of the battery and/or understanding how the one or more drilling parameters affect the performance of the battery. In some embodiments, the voltage sensor 338 is a capacitive voltage sensor, a resistive voltage sensor, analogue to digital converters (ADCs), or any other voltage sensor for measuring a voltage of the battery as discussed herein. In this way, the health measurements by the health sensor 334 may be voltage measurements of a voltage of the battery.

In some embodiments, the electronic module 331 communicates signals corresponding to the voltage measurements. For example, the electronic module 331 may continuously or periodically record the voltage measurements as discussed herein and the electronic module 331 may communicate the recorded voltage measurements. In another example, the electronic module 331 may record and/or communicate the voltage measurements when another health measurement from the health sensor 334 is recorded (e.g., temperature measurements, shock measurements, etc.), such as when another health measurement triggers a recording (e.g., threshold temperature, threshold acceleration, etc.). In this way the recorded and/or communicated voltage measurements may facilitate understanding and/or analyzing how one or more drilling parameters of the drilling environment affect performance of the battery. In some embodiments, the electronic module 331 records the voltage measurements when the voltage reaches or drops below a threshold voltage. This may correspond to a SOC, a SOH, or a performance of the battery becoming degraded, such as due to damage to the battery. In some embodiments, the electronic module records the reading of the voltage measurements (e.g., 12 v). In some embodiments, the electronic module records and/or communicates an indication, based on the voltage measurements, that the voltage has dropped below a threshold voltage. This may facilitate determining the health condition of the battery, for example, when the drilling component (and the battery) is tripped to the surface. In this way, the electronic module 331 may record and/or communicate the voltage measurements from the voltage sensor 338 as a diagnostic tool to facilitate determining the health condition of the battery and/or compiling data associated with battery performance under varying downhole conditions.

In some embodiments, the health sensor 334 includes a current sensor 339. The current sensor 339 may take current measurements of the battery (more specifically, of the energy cells 324 of the battery). For example, the current sensor 339 may measure a current output by the battery to power one or more electronic devices of a drilling component. In some embodiments, the current sensor 339 includes a plurality of sensors for taking a plurality of current measurements such as, for example, a current output to each of a plurality of electronic devices. The current measurements may correspond to a SOC of the battery, a SOH of the battery, or an ability of the battery to provide electricity to power the electronic devices. As discussed herein, one or more drilling parameters of the downhole drilling environment may affect the health of the battery, and the current measurements may facilitate determining the health condition of the battery and/or understanding how the one or more drilling parameters affect the performance of the battery. In some embodiments, the current sensor 339 is a direct or contact current sensor. For example, the circuitry of the BMS 330 may be integrated or internal to the circuitry of the energy cells 324 and may include a contact shunt resistor circuit which may directly measure a voltage across a resister and calculate current output of the battery. In some embodiments, the current sensor 339 is an indirect or contactless current sensor. For example, the circuitry of the BMS 330 may be external or independent of that of circuitry of the energy cells 324 and may include a contactless Hall Effect sensor for indirectly measuring the current output of the battery. The current sensor 339 may be a cored current sensor such as an open-loop, closed-loop, or fluxgate sensor. The current sensor 339 may be a coreless current sensor. In this way, the health measurements by the health sensor 334 may be current measurements of a current output of the battery.

In some embodiments, the electronic module 331 communicates signals corresponding to the current measurements. For example, the electronic module 331 may continuously or periodically record the current measurements as discussed herein and may communicate the recorded current measurements. In another example, the electronic module 331 may record and/or communicate the current measurements when another health measurement from the health sensor 334 is recorded (e.g., temperature measurements, shock measurements, etc.), such as when another health measurement triggers a recording (e.g., threshold temperature, threshold acceleration, etc.). In this way the recorded current measurements may facilitate understanding and/or analyzing how one or more drilling parameters of the drilling environment affect performance of the battery. In some embodiments, the electronic module 331 records and/or communicates the current measurements when the current exceeds or drops below a threshold current. This may correspond to a SOC, a SOH, or a performance of the battery becoming degraded, such as due to damage to the battery. This may also correspond to an electronic device being powered, for example, to perform one or more functions of a drilling component. In some embodiments, the electronic module records the reading of the current measurements (e.g., 4 A). In some embodiments, the electronic module 331 records and/or communicates an indication, based on the current measurements, that the current output has exceeded (or dropped below) a threshold current. This may facilitate determining the health condition of the battery, for example, when the drilling component (and the battery) is tripped to the surface. In this way, the electronic module 331 may record and/or communicate the current measurements from the current sensor 339 as a diagnostic tool to facilitate determining the health condition of the battery and/or compiling data associated with battery performance under varying downhole conditions.

In some embodiments, the health sensor 334 includes an electrochemical device 340, in a non-limiting example an electrochemical diagnostic device. The electrochemical diagnostic device 340 may measure and/or characterize the electrochemical nature of the one or more energy cells 324. For example, the electrochemical diagnostic device may include an impedance spectroscopy sensor ("IPS"). The IPS may take impedance measurements of the electrochemical impedance of the one or more energy cells 324. For example, the IPS may apply a small amplitude alternating current ("AC") signal to the energy cells 324 to probe the impedance characteristics of the cell. The IPS may scan (via the signal) over a wide range of AC frequencies to generate an impedance spectrum for the electrochemical properties of the energy cells 324. The impedance measurements may facilitate determining one or more of a SOH, SOC, capacity, damage, and degradation of the battery. This may also facilitate analyzing and/or understanding how one or more drilling parameters of the downhole environment affect the performance of the battery. In some embodiments, the electrochemical diagnostic device 340 may include one or more sensors or one or more means for measuring and/or characterizing the electrochemical nature of the energy cells 324 in addition to or in place of the IPS. For example, the electrochemical diagnostic device 340 may include sensors and/or means for measuring and/or characterizing the electrochemical nature of the energy cells 324 based on amperometry, chrono-amperometry, cyclic voltammetry, square wave voltammetry, sensors and/or means based on any other technique, and combinations thereof. In some embodiments, the electrochemical diagnostic device 340 may include a plurality of sensors for taking a plurality of electrochemical measurements such as, for example, an electrochemical measurement of each of the one or more energy cells 324. In some embodiments, the electrochemical diagnostic device 340 may be disposed or contained on a PCB of the BMS 330. In some embodiments, the electrochemical diagnostic device 340 may be included in the BMS 330 as a separate component or on a separate chip from a PCB of the BMS 330. The electrochemical diagnostic device 340 may be a capacitive or faradaic electrochemical diagnostic device. In this way, the health measurements by the health sensor 334 may be electrochemical measurements of the battery.

In some embodiments, the electronic module 331 communicates signals corresponding to the electrochemical measurements. For example, the electronic module 331 may continuously or periodically record the electrochemical measurements as discussed herein, and the electronic module 331 may communicate the electrochemical measurements. In another example, the electronic module 331 may record and/or communicate the electrochemical measurements when another health measurement from the health sensor 334 is recorded (e.g., temperature measurements, shock measurements, etc.), such as when another health measurement triggers a recording (e.g., threshold temperature, threshold acceleration, etc.). In this way, the recorded electrochemical measurements may facilitate understanding and/or analyzing how one or more drilling parameters of the drilling environment affect performance of the battery. In some embodiments, the electronic module 331 records and/or communicates the electrochemical measurements when the electrochemical nature of the energy cells 324 exceeds or drops below a threshold value, such as a threshold current, voltage, impedance etc. This may correspond to a SOC, a SOH, or a performance of the battery becoming degraded, such as due to damage to the battery. In some embodiments, the electronic module records the reading of the electrochemical measurements (e.g., 50 mΩ). In some embodiments, the electronic module 331 records and/or communicates an indication, based on the electrochemical measurements, that the electrochemical nature of the battery has dropped below a threshold value. This may facilitate determining the health condition of the battery, for example, when the drilling component (and the battery) is tripped to the surface. In this way, the electronic module 331 may record and/or communicate the electrochemical measurements from the electrochemical diagnostic device 340 as a diagnostic tool to facilitate determining the health condition of the battery and/or compiling data associated with battery performance under varying downhole conditions.

The BMS 330, and more specifically the health sensor 334, has been described primarily with respect to specific sensors for taking specific types and/or forms of health measurements. It should be understood, however, that the BMS 330 (and/or the health sensor 334) may include one or more sensors in addition to or in place of one or more of the sensors described herein. Indeed, the health sensor 334 may include any sensor and/or type of sensor for taking measurements relevant to the health of the energy cells 324, relevant to the battery generally, and/or relevant to the downhole environment. For example, the BMS 330 may include one or more sensors (e.g., positioned on one or more of the energy cells, a housing of the battery, and combinations thereof) for measuring force, stress, strain, displacement, deflection, deformation, acceleration, rotation, depth, any other parameter, and combinations thereof. In another example, the BMS 330 includes one or more sensors for measuring acoustic properties, electromagnetic (e.g., light, radio, infrared, gamma ray, X-ray, microwave) properties, electronic properties, any other property, and combinations thereof.

FIG. 3-3 is a block diagram of the BMS 330 of FIG. 3-1. As described herein, in some embodiments, the BMS 330 includes a health sensor 334 for taking health measurements associated with one or more energy cells 324. In some embodiments, the BMS 330 includes an electronic module 331 for recording the health measurements from the health sensor.

In some embodiments, the BMS 330 includes a communication module 326. The communication module 326 may be configured to communicate with one or more drilling devices 328. In some embodiments, the communication module 326 may be configured to communicate with the drilling device 328 over a physical data connection. For example, the communication module 326 may include or be in data communication with one or more data ports for electronically transferring information over a cable or wired connection. In some embodiments, the communication module 326 may be configured to communicate with the drilling devices 328 wirelessly. For example, the communication module 326 may be configured to wirelessly communicate using an Industrial Internet of Things ("IIOT") protocol such as Bluetooth, near field communication ("NFC"), Wi-Fi, LoRa, etc.

In some embodiments, the communication module 326 may be configured for long range wireless communication such as GPS, radio, cellular network, etc. For example, as described herein, the BMS 330 may operate in a sleep state such as during shipping and/or storage of the battery. While in the sleep state, the BMS 330 may be configured to detect, for example, threshold acceleration (shock) experienced by the battery that may damage the battery (or any other threshold parameter that may damage the battery). In some embodiments, the BMS 330 may be able to identify, through the long-range wireless communication, a geographic location associated with the shock experienced by the battery and may log this information with the electronic module 331. In some embodiments, the BMS 330 may communicate an indication (e.g., to a remote receiver) of the detection of the threshold parameter (and/or a location) through the long-range wireless capability of the communication module 326. This may facilitate identifying where and/or when a battery was damaged, for example, during shipping and/or storage of the battery. This may also facilitate identifying a responsible party for the damage to the battery during shipping and/or storage.

In some embodiments, the communication module 326 may be in data communication with the electronic module 331, and more specifically may access the memory 333 of the electronic module 331. For example, the communication module 326 may access the backlog and may communicate some or all of the backlog (e.g., some or all of the health measurements recorded in the backlog) to the drilling devices 328. In another example, the communication module 326 may receive communications from one of the drilling devices 328 and may communicate with the electronic module 331 to record or store information (e.g., health measurements) on the memory 333. In this way, the communication module 326 may communicate information to and from the BMS 330.

In some situations, the drilling devices 328 may include drilling devices located at the surface of a borehole. For example, as described herein, in some situations the battery may be tripped to the surface or removed from the borehole in conjunction with a drilling component being tripped to the surface. The communication module 326 may facilitate communicating one or more signals corresponding to the health measurements. For example, the communication module 326 may facilitate communicating an indication of the battery experiencing a drilling parameter in excess of a threshold value. In another example, the communication module 326 may facilitate communicating the backlog to one or more computing devices at the surface, for example, to facilitate in determining the health condition of the battery. In another example, the BMS 330 may determine the health condition of the battery as described herein, and the communication module 326 may communicate the health condition to one or more computing devices at the surface. In this way, the BMS 330 may communicate one or more signals with persons or devices at the surface, for example, in order to determine whether the battery may be reused in a subsequent drilling activity.

In some situations, the drilling devices 328 may include drilling components included in the drill string or BHA of the drilling system. For example, one or more drilling components may include electronic devices for controlling and/or monitoring the performance of the drilling component and/or drilling parameters associated with the drilling component. In some embodiments, the electronic devices of these drilling components may communicate with the BMS 330 via the communication modules 326 to, for example, log information through the electronic module 331 (such as metrics or measurements associated with the drilling components). In some embodiments, the communications with downhole drilling components may be in conjunction, or related to, the logging of health measurements of the battery. In some embodiments, the communications with downhole drilling components may be independent of or not related to the logging of health measurements of the battery. In this way, any number of drilling components may include any number of electronic devices (e.g., sensors) without necessarily requiring a dedicated processor or system such as the BMS 330 for monitoring and/or controlling the drilling component. In these situations, information related to the drilling component may be communicated and/or stored on or by the BMS 330 via the communication module 326. In this way, the communication module 326 may communicate with one or more downhole drilling components to facilitate a comprehensive system of monitoring and/or measuring any number of drilling components and/or any number of drilling parameters associated with any number of drilling components. As will be described herein in detail in connection with FIG. 4, in some embodiments, the communication module 326 may communicate with one or more additional battery monitoring systems 330.

Figures 3, 4:
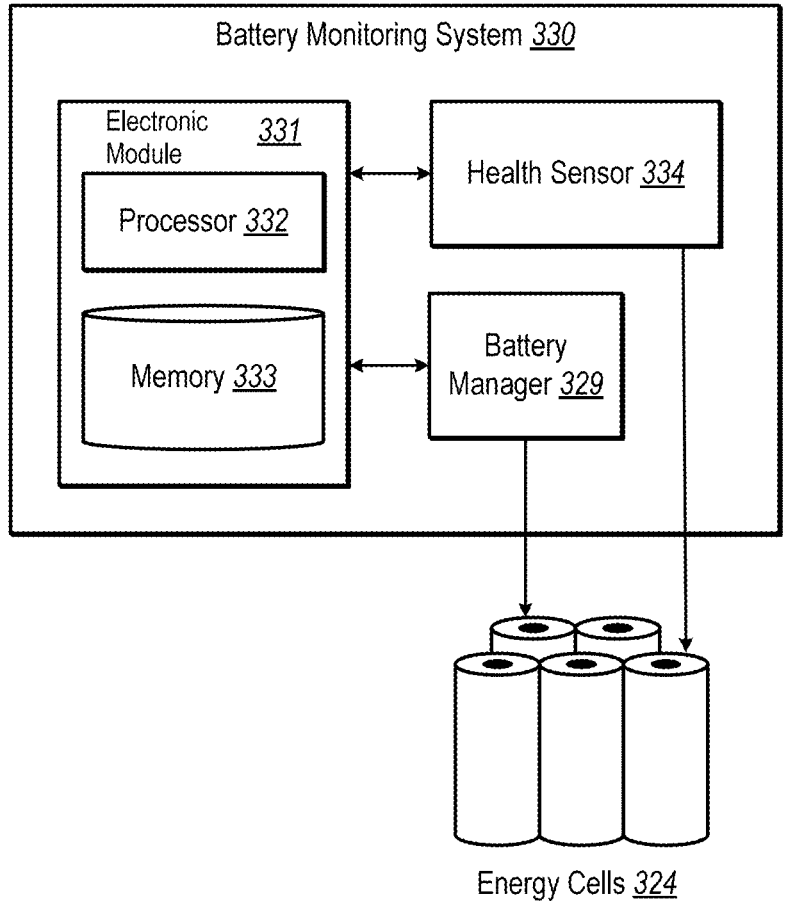
Figure 4:
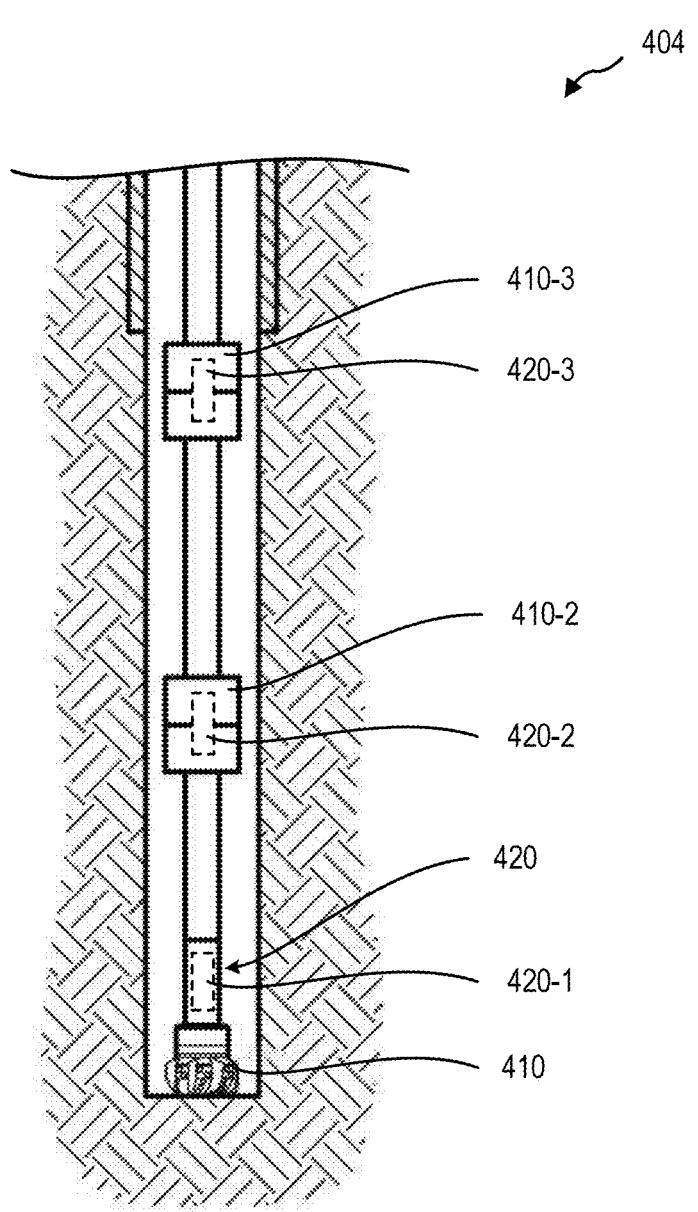

FIG. 3-4 is a block diagram of the BMS 330 of FIG. 3-1. In some embodiments, the BMS 330 may include a battery manager 329. In some embodiments, the battery manager 329 may be operatively coupled to each of the energy cells 324. For example, the battery manager 329 may be configured to control and/or manage one or more aspects of each of the energy cells 324, either individually or as a whole.

As described herein, one or more aspects of the energy cells 324 (e.g., current, voltage, etc.) may be monitored or measured by the health sensor 334 and the electronic module 331. The battery manager may facilitate monitoring each energy cell individually of the energy cells 324 during usage and/or discharge. In some embodiments, the battery manager 329 may be configured to one or more of isolate, connect, and or disconnect one or more individual energy cells. For example, the battery manager 329 may dynamically switch individual energy cells in and/or out during charging and/or discharging. This may facilitate maximizing the overall battery performance. For example, the battery manager may dynamically switch individual energy cells based on an instantaneous voltage to aid in balancing a charge of the energy cells. This may help improve the performance of the energy cells 324 and/or extend the lifetime of the energy cells 324. In some embodiments, the battery manager 329 may facilitate charging and discharging of the energy cells 324 such that the battery may be used without the need for an external battery manager. In this way the battery may be tool agnostic (e.g., plug and play) and may readily be used in any number of applications to power any number of electronic devices.

FIG. 4 is an example of a drilling tool assembly 404, according to at least one embodiment of the present disclosure. As discussed herein, the drilling tool assembly 404 may have one or more drilling components included as part of a drill string 105 or a BHA 106.

In some situations, it may be advantageous to monitor and/or measure one or more drilling parameters of one or more of the various drilling components of the drilling tool assembly 404. In some instances, the drilling tool assembly 404 may include one or more dedicated measurement and/or logging tools (e.g., subs) for measuring these drilling parameters. In some situations, however, it may be prohibitively difficult or costly to include a dedicated drilling component for measuring and/or monitoring one or more drilling component of the drilling tool assembly 404. As discussed herein, these drilling components may include a battery, such as that discussed above, for powering electronic devices. The battery may include a BMS for measuring and recording health measurements associated with a health condition of the battery. The health measurements may be useful for determining whether a battery can be re-used, as well as analyzing how a battery performs under varying conditions of the downhole drilling environment.

In some embodiments, the BMS recording health measurements may also be indicative of one or more drilling parameters associated with a drilling component housing the battery. For example, a drilling tool such as a bit 410 may include a battery 420 which may measure and/or record temperature measurements, vibration measurements, shock measurements, etc. associated with the health of the battery. In some embodiments, these health measurements may be associated with, or useful in understanding one or more drilling parameters of the bit 410. In some embodiments, the battery 420 may measure and/or record one or more measurements in addition to the health measurements associated with a health of the battery 420. For example, the battery 420 may be configured to measure one or more drilling parameters associated specifically with the bit 410 (e.g., temperature, rate of rotation, rate of penetration, weight on bit, torque on bit, etc.). In this way, the battery 420 may be a diagnostic tool for monitoring one or more drilling components of the drilling tool assembly 404, such as the bit 410. This may be advantageous as the battery 420 may be readily included in any drilling component that uses a battery for power. In this way, the battery 420 may measure and record diagnostic information without the need for including a designated logging tool (or multiple logging tools) in the drilling tool assembly 404.

In some embodiments, the two or more of the drilling components of the drilling tool assembly 404 may include a battery 420. For example, the bit 410 may include a first battery 420-1, a second drilling component 410-2 may include a second battery 420-2, and a third drilling component 410-3 may include a battery 420-3. Each of the batteries 420-1, 420-2, and 420-3 may measure and/or monitor drilling parameters associated with the corresponding drilling component. In this way, the drilling tool assembly 404 may include multiple batteries 420 across multiple drilling components in order to measure and/or record distributed measurements of drilling parameters (e.g., vibration, shock, etc.) associated with the drilling system.

In some embodiments, one or more of the batteries 420 may communicate with one or more other batteries 420. For example, a BMS or each of the batteries 420 (or more specifically a communication module of the BMS as described in connection with FIG. 3-3) may communicate in order to facilitate measuring, processing, or recording data related to drilling. In another example, the batteries 420 may communicate information and may record and or backup the information measured by other batteries 420. In another example, one or more batteries 420 may be central batteries which may include electronic components (e.g., with processors and memory), while one or more satellite batteries may include sensors which communicate measurements to the central batteries for recording and/or logging. In this way, any number of batteries in any number of configurations may be included at one or more locations throughout the drilling tool assembly 404 for measuring drilling parameters associated with drilling in order to provide comprehensive measurements of the parameters exhibited by or drilling parameters experienced by the drilling tool assembly 404.

Figure 5:
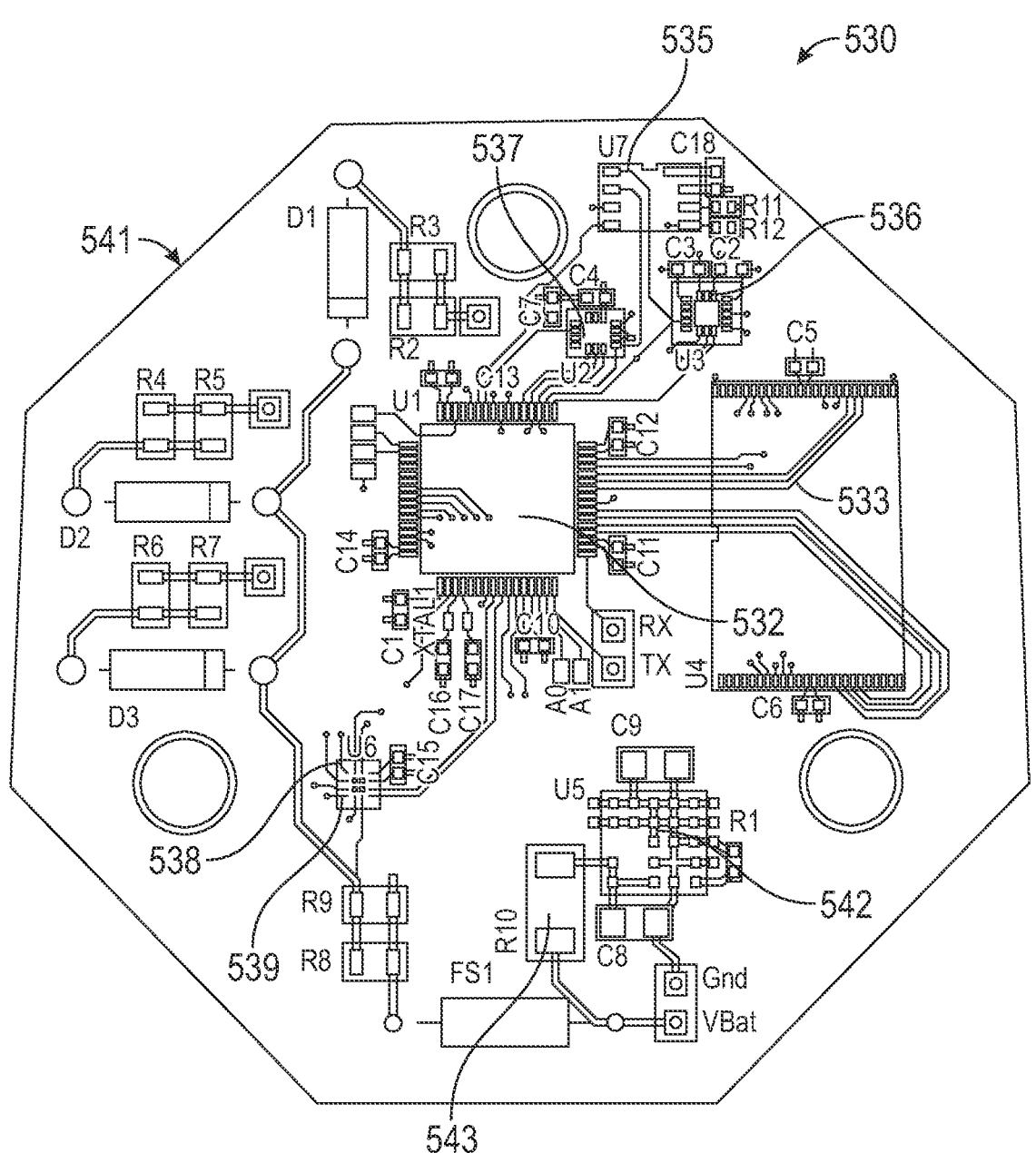
FIG. 5 is an example of a battery monitoring system, according to at least one embodiment of the present disclosure.

FIG. 5 is an example of a BMS 530, according to at least one embodiment of the present disclosure. As described herein, the BMS 530 may be included in a battery for measuring and/or recording one or more health measurements associated with a battery for powering a downhole tool.

According to at least one embodiment of the present disclosure, the BMS 530 is contained or disposed on a PCB 541. In some embodiments, the BMS 530 includes a temperature sensor 535. For example, the temperature sensor 535 may be the temperature sensor 335 of the health sensor 334 described herein in connection with FIG. 3-2. In some embodiments, the BMS 530 includes a voltage sensor 538. For example, the voltage sensor 538 may be the voltage sensor 338 of the health sensor 334 described herein in connection with FIG. 3-2. In some embodiments, the BMS 530 includes a current sensor 539. For example, the current sensor 539 may be the current sensor 339 of the health sensor 334 as discussed herein in connection with FIG. 3-2.

In some embodiments, the BMS 530 includes a processor 532. For example, the processor 532 may be the processor 332 of the electronic module 331 as described herein in connection with FIG. 3-2. In some embodiments, the BMS 530 includes memory 533. For example, the memory 533 may be the memory 333 of the electronic module 331 as described herein in connection with FIG. 3-2. The memory 533 may be 4 GB of non-volatile flash memory.

In some embodiments, the BMS 530 includes a vibration sensor 537. For example, the vibration sensor 537 may be the vibration sensor 337 of the health sensor 334 as described herein in connection with FIG. 3-2. In some embodiments, the vibration sensor 537 is a 3-axis accelerometer and gyroscope sensor. In some embodiments the BMS 530 includes a shock sensor 536. For example, the shock sensor 536 may be the shock sensor 336 of the health sensor 334 as described herein in connection with FIG. 3-2. In some embodiments, the shock sensor 536 is a ±200 g 3-axis accelerometer.

According to at least one embodiment of the present disclosure, the BMS 530 includes a voltage regulator 542. For example, as described herein, the BMS 530 may be connected to the circuitry of one or more energy cells. The energy cells may provide electricity for powering the BMS 530. The voltage regulator 542 may maintain the voltage supplied to the BMS 530 at a constant voltage. For example, the BMS 530 may operate at a different voltage than that which the energy cells supply and the voltage regulator 542 may modify the voltage so that the BMS 530 may operate properly. In another example, situations may arise where the voltage from the energy cells surges (e.g., due to downhole conditions), and the voltage regulator 542 may maintain a constant voltage to protect the BMS 530 from the surge.

According to at least one embodiment of the present disclosure, the BMS 530 includes one or more fuses 543. The fuses 543 may protect the battery from an overloading of electricity, so that operation of the battery is unaffected by the failure of the BMS 530 to short circuit. For example, in some situations the BMS 530 may receive a surge of electricity, and the fuses 543 may break or blow in order to prevent damage to the battery. In another example, drilling parameters of the downhole drilling environment may cause one or more of the components of the BMS 530 to experience an increased loading or an increased current draw. The fuses 543 may break or blow to prevent this increased current draw from damaging the battery. In some embodiments, the fuses 543 are replaceable such that they may be replaced without replacing the BMS 530. In some embodiments, the fuses 543 are integrally disposed on the PCB 541 and are not replaceable such that the BMS 530 must be replaced when the fuses break. In this way, the BMS 530 may be failsafe, and the fuses 543 may protect the battery.

Figure 6:
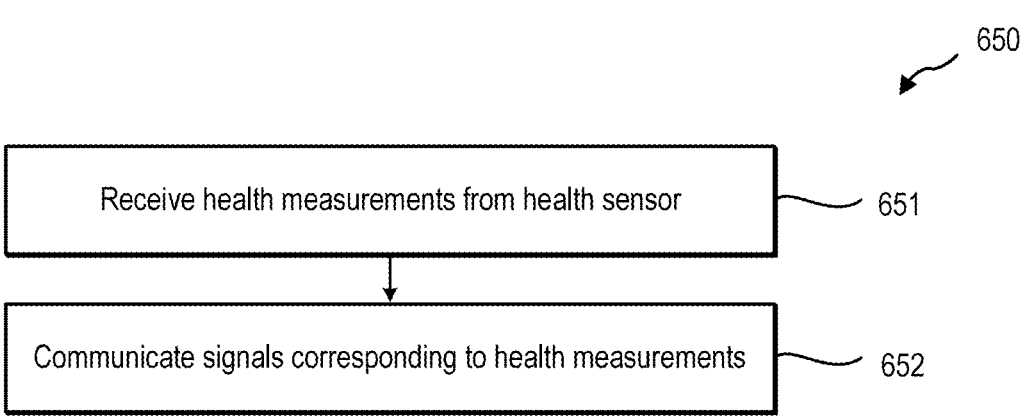
FIG. 6 illustrates a flow chart for a method of using a battery monitoring system, according to at least one embodiment of the present disclosure.

FIG. 6 illustrates a flowchart of a method 650 or a series of acts for operating a battery monitoring system as discussed herein, according to at least one embodiment of the present disclosure. While FIG. 6 illustrates acts according to one embodiment, alternative embodiments may one or more of omit, add to, reorder, and modify any of the acts shown in FIG. 6.

In some embodiments, the method 650 includes receiving health measurements from a health sensor at 651. The health measurements may be received during downhole drilling operations. The health sensor may be part of a battery monitoring system and may take health measurements that correspond to a health condition of a downhole battery. The battery monitoring system may be contained within a housing of the battery. The battery may be operatively connected to a downhole tool. For example, the battery may provide electricity to the downhole tool to power an electronic device of the downhole tool. The battery may be secured to the downhole tool via the housing.

In some embodiments, the method 650 includes communicating one or more signals corresponding to the health measurements at 652. The one or more signals may be communicated such that the health condition of the battery may be determined. In some embodiments, the one or more signals include one or more of lighting a light, displaying a readout on a display, and toggling a switch. In some embodiments, the one or more signals are an indication of the health condition. The health condition may correspond to a capacity for the battery to be reused in a subsequent drilling operation. In some embodiments, the one or more signals includes an indication of whether a temperature experienced by the battery exceeded a threshold temperature. The threshold temperature may be 135° C. In some embodiments, the one or more signals includes an indication of whether battery experienced a shock exceeding a threshold acceleration. The threshold acceleration may be 50 g. In some embodiments, the one or more signals includes an indication of whether the battery experienced a vibration exceeding a threshold frequency. The threshold frequency may be 500 Hz. In some embodiments, the one or more signals includes an indication of a voltage of the battery. In some embodiments, the one or more signals includes an indication of a current draw of the battery. In some embodiments, the one or more signals includes an indication of a SOH of the battery. In some embodiments, the one or more signals includes an indication of a SOC of the battery.

Figure 7:
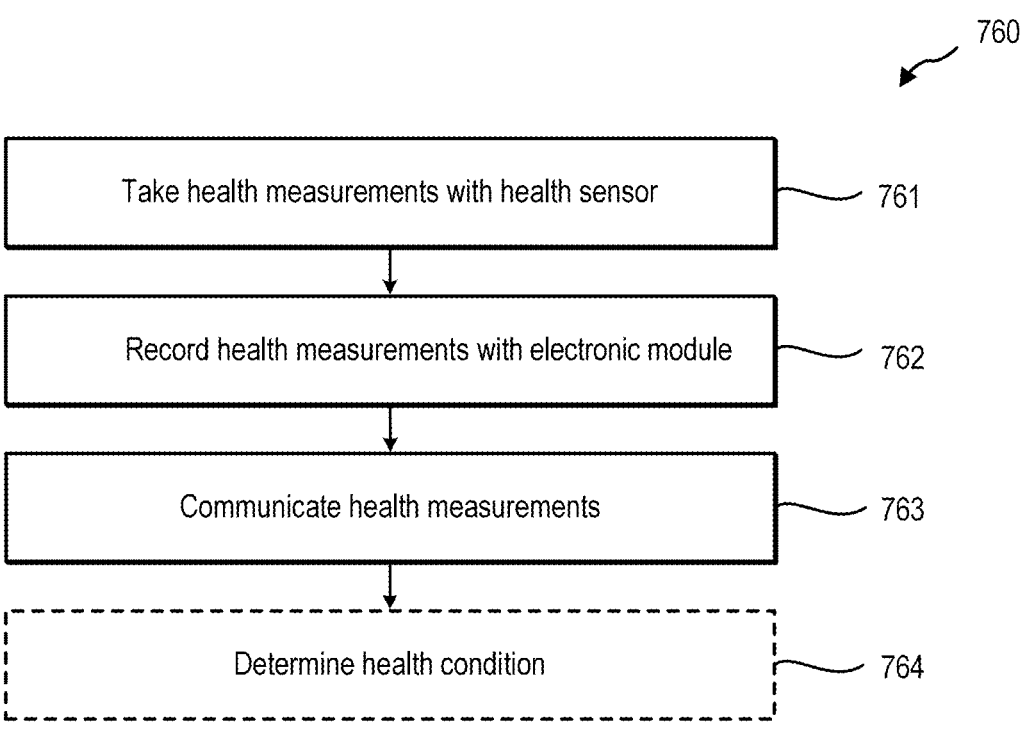
FIG. 7 illustrates a flow chart for a method of using a battery monitoring system, according to at least one embodiment of the present disclosure.

FIG. 7 illustrates a flowchart of a method 760 or a series of acts for operating a battery monitoring system as discussed herein, according to at least one embodiment of the present disclosure. While FIG. 7 illustrates acts according to one embodiment, alternative embodiments may one or more of omit, add to, reorder, and modify any of the acts shown in FIG. 7.

In some embodiments, the method 760 includes taking health measurements with a health sensor at 761. The health measurements may be received during downhole drilling operations. The health sensor may be part of a battery monitoring system and may take health measurements that correspond to a health condition of a downhole battery. The health condition may correspond to a capacity of the battery to be reused in a subsequent drilling operation. The battery monitoring system may be contained within a housing of the battery. The battery may be operatively connected to a downhole tool. For example, the battery may provide electricity to the downhole tool to power an electronic device of the downhole tool. The battery may be secured to the downhole tool via the housing.

In some embodiments, the health measurements correspond to a temperature experienced by the battery. In some embodiments, the health measurements correspond to a shock experienced by the battery. In some embodiments, the health measurements correspond to a vibration experienced by the battery.

In some embodiments, the method 760 includes recording the health measurements with an electronic module at 762. The health measurements may be received by an electronic module of the battery monitoring system and the battery monitoring system may record the health measurements. In some embodiments, the electronic module periodically records the health measurements. For example, the electronic module may periodically record the health measurements based on a health measurement taken by the health sensor exceeding a threshold value. In some embodiments, the health measurement exceeding a threshold value is a temperature experienced by the battery exceeding 135° C. In some embodiments, the health measurement exceeding a threshold value is a shock experienced by the battery exceeding 50 g. In some embodiments the health measurement exceeding a threshold value is a vibration experienced by the battery exceeding 500 Hz.

In some embodiments, the method 760 includes communicating the health measurements at 763. The health measurements may be communicated such that a health condition of the battery can be determined.

In some embodiments, the method 760 includes the optional step of determining the health condition of the battery at 764. For example, the battery monitoring system may determine the health condition based on the health measurements. The battery monitoring system may indicate the health condition.

Figure 8:
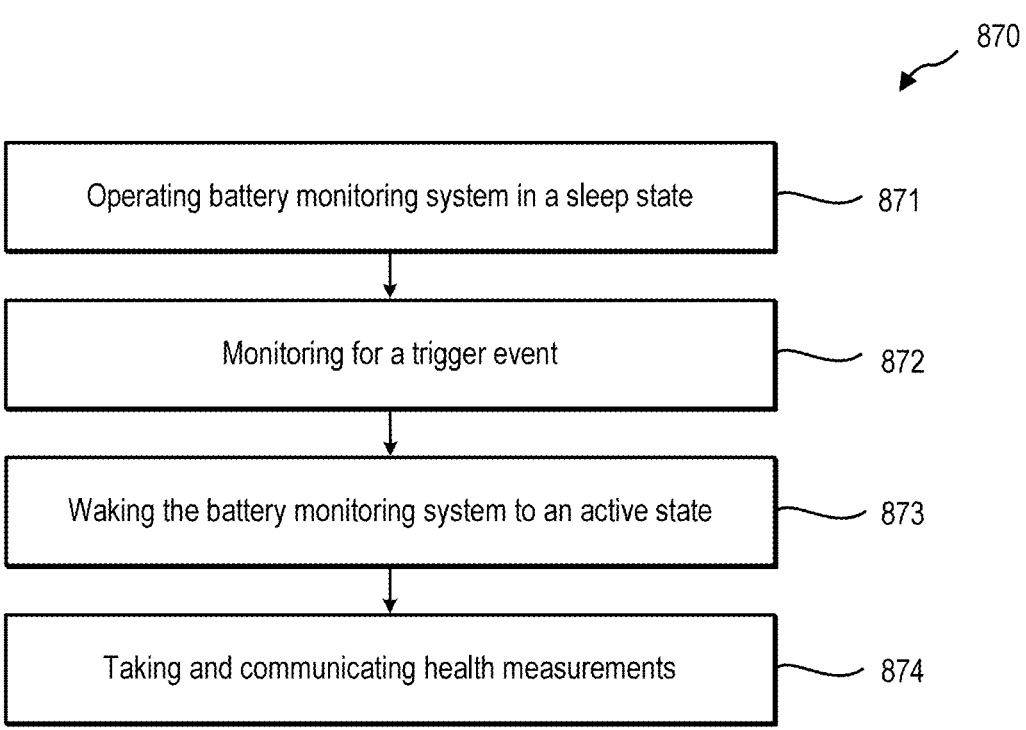
FIG. 8 illustrates a flow chart for a method of using a battery monitoring system, according to at least one embodiment of the present disclosure.

FIG. 8 illustrates a method 870 or a series of acts for operating a battery monitoring system as discussed herein, according to at least one embodiment of the present disclosure. While FIG. 8 illustrates acts according to one embodiment, alternative embodiments may one or more of omit, add to, reorder, and modify any of the acts shown in FIG. 8.

In some embodiments, the method 870 includes operating a BMS in a sleep state at 871. In some embodiments, the BMS is contained within a housing of a battery configured to connect to a downhole tool to provide an electrical power to the downhole tool. In some embodiments, the BMS is powered by the battery. In some embodiments, the BMS operates at less than 1 mA of current draw while in the sleep state.

In some embodiments, the BMS operates in a deep sleep state. The deep sleep state may correspond to a production or manufacturing of the battery. For example, the BMS may be configured to operate in the deep sleep state when it is manufactured. The deep sleep state may correspond to a shipping of the battery. For example, the BMS may be configured to operate in the deep sleep state while it is being shipped. The deep sleep state may correspond to a storage of the battery. For example, the BMS may be configured to operate in the deep sleep state while it is being stored. In some embodiments, the BMS does not monitor for the trigger event while in the deep sleep state.

In some embodiments, the method 870 includes monitoring for a trigger event at 872. The trigger even may be associated with a downhole drilling operation of the downhole tool. In some embodiments, the trigger event corresponds to one or more of a rotation, acceleration, temperature, shock, vibration, and current draw of the battery.

In some embodiments, the method 870 includes waking the BMS to an active state at 873. Waking to the active state may be based on detecting the trigger event. In some embodiments, the BMS operates at no more than 5 mA of current draw while in the active state.

In some embodiments, the method 870 includes taking and communicating health measurements at 874. Taking and communicating health measurements may be performed while the BMS is operating in the active state, or once the BMS has been waked to the active state. In some embodiments, the health measurements are recorded periodically. In some embodiments, an electronic module of the BMS periodically records the health measurements.

The embodiments of the battery monitoring system have been primarily described with reference to wellbore drilling operations; the battery monitoring system described herein may be used in applications other than the drilling of a wellbore. In other embodiments, battery monitoring system according to the present disclosure may be used outside a wellbore or other downhole environment used for the exploration or production of natural resources. For instance, the battery monitoring system of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

As discussed herein in detail, the present disclosure includes a number of practical applications having features described herein that provide benefits and/or solve problems associated with monitoring and/or assessing battery health as well as measuring and/or logging parameters generally in a downhole drilling environment. Some example benefits are discussed herein in connection with various features and functionalities provided by a battery monitoring system implemented in connection with one or more downhole tool batteries. It will be appreciated that benefits explicitly discussed in connection with one or more embodiments described herein are provided by way of example and are not intended to be an exhaustive list of all possible benefits of the battery monitoring system.

For example, downhole tool batteries are often used in connection with various downhole tools which operate within a borehole below the surface of the earth. The downhole drilling environment may have an adverse effect on the health and/or performance of the downhole tool battery. For example, high temperatures, shocks, and/or vibrations may damage or degrade the battery. By implementing a battery with a BMS as described herein to actively monitor and/or measure drilling parameters associated with damage or degradation of the battery, a health condition of the battery may be more readily determined, for example, based on the drilling parameters to which the battery was exposed. A BMS that is configured to sense and/or communicate an indication of exposure to relevant drilling parameters may facilitate determining whether a battery may be used in a subsequent drilling operation, or whether the battery is best suited for replacement.

The BMS as described herein may be readily included in one or more components of the drilling tool assembly. As described herein, the BMS may be contained within the battery itself as one single, sealed unit. This provides the benefit of including or implementing a sophisticated system such as the BMS by simply inserting or connecting a battery as would be the case with any conventional downhole tool battery. This forgoes the need to include, initiate, setup, or otherwise provide an additional component or system when configuring a drilling tool assembly. This may be facilitated, at least in part, by the ability for the BMS to operate in a sleep state (e.g., from the factory) and automatically wake to an active state and begin its monitoring and/or measuring functionality with little to no input or initialization. In this way, the benefits associated with using a sophisticated system as described herein may be easily implemented with any drilling tool assembly.

In addition to monitoring and/or measuring drilling parameters relevant to the battery, the BMS may offer the additional benefit of providing valuable information about one or more drilling components with which the battery is associated. For example, dedicated measurement and/or logging components (e.g., subs) are typically employed downhole as an independent component of the drilling tool assembly in order to measure and/or record drilling parameters associated with the drilling tool assembly. In some situations, it may not be possible or practical to employ a large quantity of these logging tools. A battery with a BMS according to the present disclosure may provide the benefit of measuring and/or logging valuable information relevant to one or more components of the drilling tool assembly without having to employ a dedicated logging tool. As many downhole drilling components use batteries for powering electronic devices of the drilling component, a BMS as described herein may be employed anywhere where a downhole battery is typically used. This may essentially turn the component (e.g., via the battery and BMS) into a measurement and/or logging tool by simply including the battery as described herein. In this way, any number of batteries may feasibly be included in the drilling tool assembly for providing a distributed and comprehensive measurement profile of the drilling parameters throughout the drilling tool assembly.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of operating a battery monitoring system, comprising:

during downhole drilling operations and while a downhole tool and a battery are located downhole in a wellbore, taking health measurements with a health sensor of the battery monitoring system, the health measurements corresponding to a health condition of the battery operatively connected to the downhole tool, wherein the health measurements include a temperature experienced by the battery and wherein the health sensor is contained within a housing of the battery secured to the downhole tool;

periodically recording the health measurements with an electronic module of the battery monitoring system in response to the temperature exceeding 135° C., wherein the electronic module is contained within the housing, and wherein the health sensor and the electronic module are powered by the battery;

communicating the health measurements recorded by the electronic module such that the health condition of the battery is determined; and operating the battery monitoring system in a sleep state with less than 1 mA of current draw.

2. The method of claim 1, wherein the health measurements correspond to one or more of a shock experienced by the battery or a vibration experienced by the battery.

3. The method of claim 1, further comprising, with the battery monitoring system:

determining the health condition of the battery based on the health measurements, wherein the health condition corresponds to a capacity for the battery to be reused in a subsequent drilling operation; and indicating the health condition.

4. The method of claim 1, wherein communicating the health measurements includes communicating the health measurements wirelessly.

5. The method of claim 1, wherein the electronic module is a datalogger.

6. A method of operating a battery monitoring system, comprising:

operating the battery monitoring system in a sleep state with less than 1 mA of current draw, wherein the battery monitoring system is contained within a housing of a battery configured to connect to a downhole tool to provide electrical power to the downhole tool;

while in the sleep state, monitoring, with one or more sensors of the battery monitoring system, for a trigger event associated with a downhole drilling operation of the downhole tool;

based on detecting the trigger event, waking the battery monitoring system to an active state; and while in the active state and while the battery and the downhole tool are located downhole in a wellbore:

taking health measurements corresponding to a health condition of the battery with a health sensor powered by the battery and contained within the housing of the battery secured to the downhole tool; and communicating one or more signals corresponding to the health measurements such that the health condition may be determined.

7. The method of claim 6, wherein the trigger event corresponds to one or more of a rotation, acceleration, temperature, shock, vibration, current draw, radio frequency signal, or Bluetooth signal of the battery.

8. The method of claim 6, wherein the battery monitoring system is powered by the battery.

9. The method of claim 6, further comprising, while operating in the active state, operating at no more than 5 mA of current draw.

10. The method of claim 6, further comprising operating in a deep sleep state, wherein the deep sleep state corresponds to one or more of a manufacturing, a shipping, or a storage of the battery, and wherein in the deep sleep state the battery monitoring system will not monitor for the trigger event.

11. The method of claim 1, further comprising operating the downhole tool during the downhole drilling operations with between 1 mA and 5 mA of current draw.

12. The method of claim 1, wherein the housing of the battery completely encloses the battery and the electronic module such that the battery and the electronic module are sealed within the housing.

13. The method of claim 6, wherein the health measurements include a temperature measurement, and the method further comprises periodically recording the temperature measurement in response to the temperature measurement exceeding 135° C.

14. A system, comprising:

a processor and a memory, the memory including instructions that cause the processor to:

during downhole drilling operations and while a downhole tool and a battery are located downhole in a wellbore with the battery powering the downhole tool with between 1 mA and 5 mA of current draw, take health measurements with a health sensor of a battery monitoring system, the health measurements corresponding to a health condition of the battery operatively connected to the downhole tool, wherein the health measurements include a temperature experienced by the battery and wherein the health sensor is contained within a housing of the battery secured to the downhole tool;

periodically record the health measurements with an electronic module of the battery monitoring system in response to the temperature exceeding 135° C., wherein the electronic module is contained within the housing, and wherein the health sensor and the electronic module are powered by the battery; and communicate the health measurements recorded by the electronic module such that the health condition of the battery can be determined.

\* \* \* \* \*